US012568502B2

(12) United States Patent
Gao et al.

(10) Patent No.: US 12,568,502 B2
(45) Date of Patent: Mar. 3, 2026

(54) MIXED SIGNAL DCI AND MULTI-DCI FOR PDSCH SCHEDULING

(71) Applicant: Telefonaktiebolaget LM Ericsson (publ), Stockholm (SE)

(72) Inventors: Shiwei Gao, Nepean (CA); Mattias Frenne, Uppsala (SE); Helka-Liina Määttänen, Helsinki (FI); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 743 days.

(21) Appl. No.: 17/913,463

(22) PCT Filed: Mar. 26, 2021

(86) PCT No.: PCT/IB2021/052547
§ 371 (c)(1),
(2) Date: Sep. 22, 2022

(87) PCT Pub. No.: WO2021/191874
PCT Pub. Date: Sep. 30, 2021

(65) Prior Publication Data
US 2023/0132040 A1 Apr. 27, 2023

Related U.S. Application Data

(60) Provisional application No. 63/000,887, filed on Mar. 27, 2020.

(51) Int. Cl.
*H04W 88/08* (2009.01)
*H04L 5/00* (2006.01)
*H04W 72/23* (2023.01)

(52) U.S. Cl.
CPC ........... *H04W 72/23* (2023.01); *H04L 5/0053* (2013.01); *H04L 5/0098* (2013.01)

(58) Field of Classification Search
CPC .... H04W 72/23; H04W 72/543; H04L 5/0053
See application file for complete search history.

(56) References Cited

U.S. PATENT DOCUMENTS

2019/0313429 A1* 10/2019 Cheng ................... H04W 76/27
2020/0077369 A1 3/2020 Zhang et al.
(Continued)

OTHER PUBLICATIONS

3GPP TSG-RAN WG1#88, R1-1703290 Title:On a Wake-up Signal for Active Mode UEs (Year: 2017).*
(Continued)

*Primary Examiner* — Faruk Hamza
*Assistant Examiner* — Abusayeed M Haque
(74) *Attorney, Agent, or Firm* — Sonoda & Kobayashi Intellectual Property Law; Sarvajit S. Patil

(57) ABSTRACT

Systems and methods for mixed signal Downlink Control Information (DCI) and multi-DCI for Physical Downlink Shared Channel (PDSCH) scheduling are disclosed. In one embodiment, a method performed by a User Equipment (UE) comprises receiving a configuration of first and second sets of Control Resource Sets (CORESETs), and a list of Transmission Configuration Indication (TCI) states for PDSCH. The method further comprises receiving first and second TCI activation commands associated to the respective sets of CORESETs. The method further comprises receiving first and second Physical Downlink Control Channels (PDCCHs) carrying first and second DCIs in first and second CORESETs from among the first and second sets of CORESETs, respectively, and receiving a first PDSCH(s) scheduled by the first DCI and a second PDSCH(s) scheduled by the second DCI, wherein the first and/or second DCI comprises a TCI codepoint that is mapped to two of the respective activated TCI states.

19 Claims, 21 Drawing Sheets

(56) References Cited

U.S. PATENT DOCUMENTS

| | | | | |
|---|---|---|---|---|
| 2020/0221485 A1* | 7/2020 | Cirik | .................. | H04B 7/0695 |
| 2021/0218500 A1* | 7/2021 | Bhamri | ................ | H04W 72/21 |
| 2022/0109547 A1* | 4/2022 | Svedman | ............. | H04L 5/0053 |

OTHER PUBLICATIONS

3GPP TSG-RAN WG1#88, R1-1703289 Title:On Data Transmission on Control Resource Set (Year: 2017).*

Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.

NTT DOCOMO, Inc, et al., "R1-1912893: Enhancements on multi-TRP/panel transmission," 3GPP TSG RAN WG1 #99, Nov. 18-22, 2019, Reno, Nevada, 11 pages.

ZTE, "R1-1910284: Enhancements on Multi-TRP and Multi-panel Transmission," 3GPP TSG RAN WG1 #98bis, Oct. 14-20, 2019, Chongqing, China, 10 pages.

International Search Report and Written Opinion for International Patent Application No. PCT/IB2021/052547, mailed Jul. 1, 2021, 20 pages.

* cited by examiner

| | | |
|---|---|---|
| R | Serving Cell ID | BWP ID | Oct 1 |
| $C_0$ | TCI state $ID_{0,1}$ | Oct 2 |
| R | TCI state $ID_{0,2}$ | Oct 3 (Optional) |

...

| | |
|---|---|
| $C_N$ | TCI state $ID_{N,1}$ | Oct M-1 |
| R | TCI state $ID_{N,2}$ | Oct M (Optional) |

TRP1

PDCCH (DCI)
PDSCH (CW0, LAYER 1, TCI STATE 1)

UE

PDSCH (CW0, LAYER 2, TCI STATE 2)

TRP2

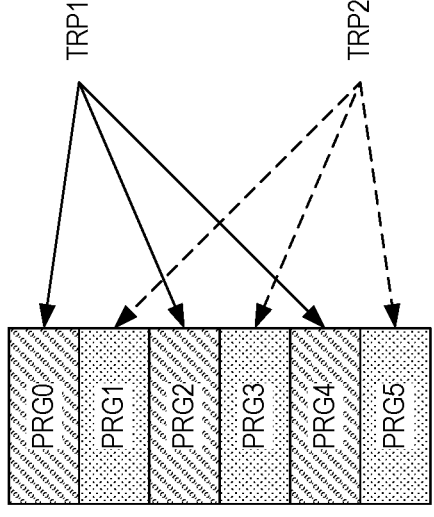
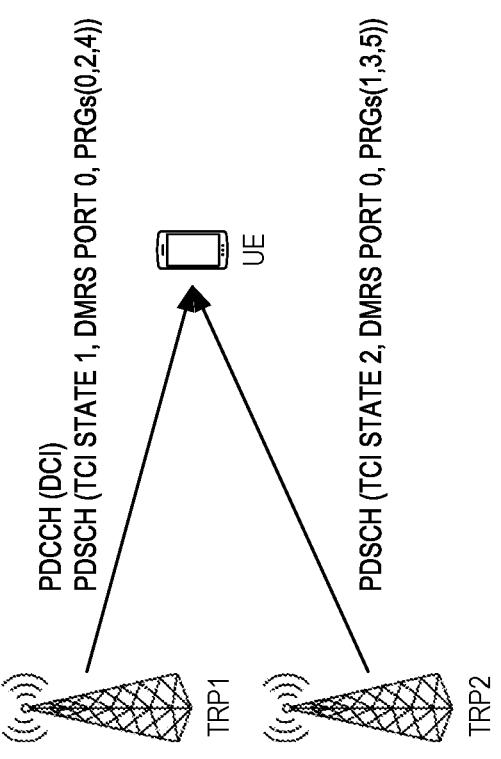
*FIG. 5*

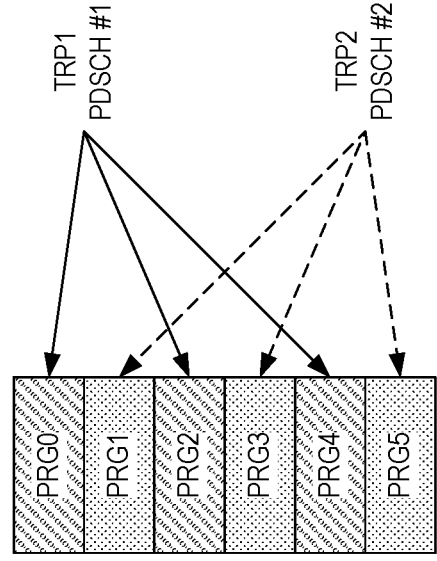
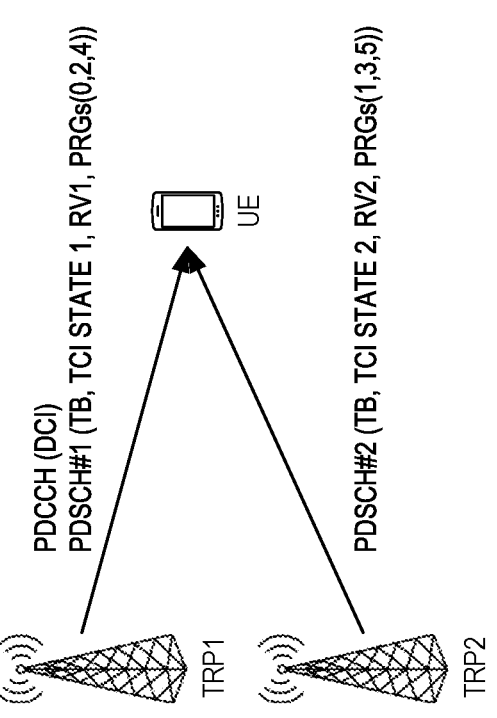
*FIG. 6*

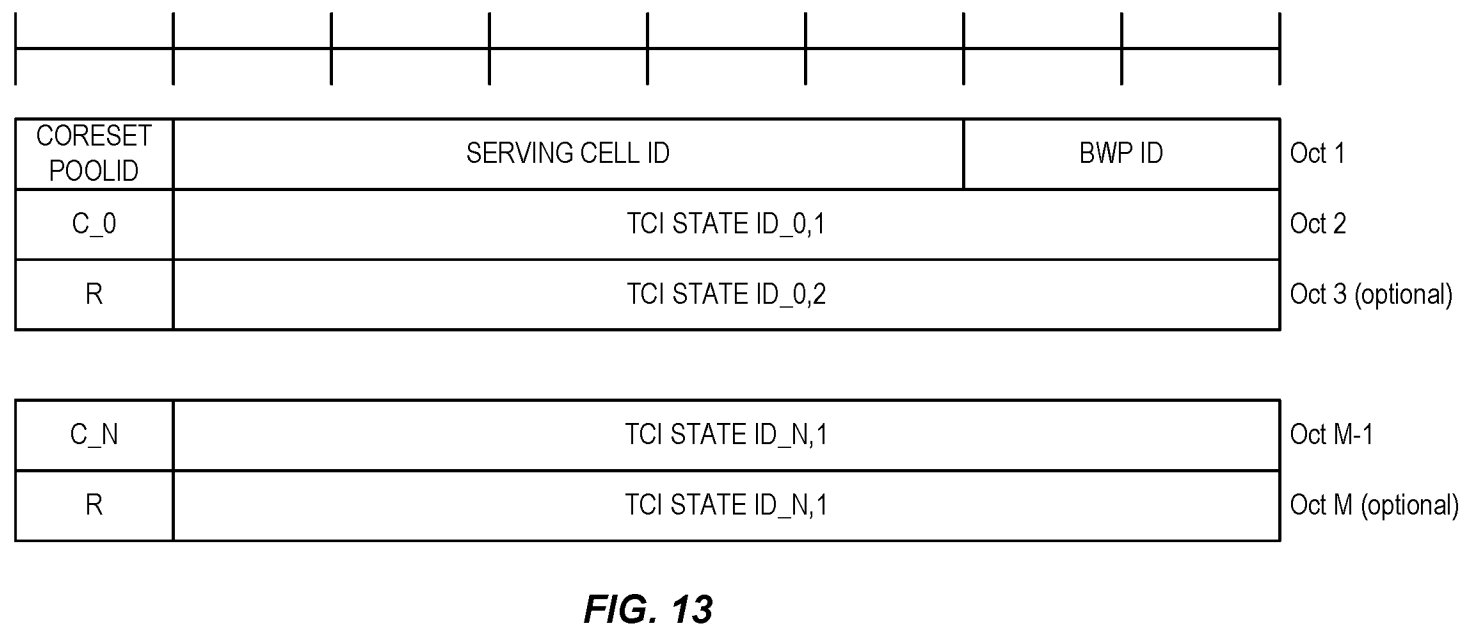

| CORESET POOLID | SERVING CELL ID | | | | BWP ID | | | Oct 1 |
|---|---|---|---|---|---|---|---|---|
| C_0 | TCI STATE ID_0,1 | | | | | | | Oct 2 |
| R | TCI STATE ID_0,2 | | | | | | | Oct 3 (optional) |

| C_N | TCI STATE ID_N,1 | | | | | | | Oct M-1 |
| R | TCI STATE ID_N,1 | | | | | | | Oct M (optional) |

*FIG. 13*

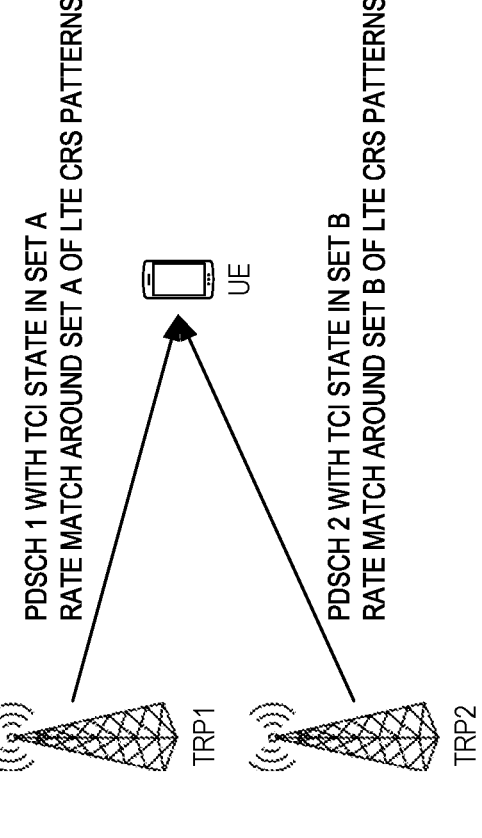

CORESETS WITH CORESETPoolIndex=0

SET A OF TCI STATES
SET A OF LTE CRS PATTERNS
ASSOCIATED WITH CORESETPoolIndex

CORESETS WITH CORESETPoolIndex=1

SET B OF TCI STATES
SET B OF LTE CRS PATTERNS
ASSOCIATED WITH CORESETPoolIndex

PDSCH 1 WITH TCI STATE IN SET A
RATE MATCH AROUND SET A OF LTE CRS PATTERNS

PDSCH 2 WITH TCI STATE IN SET B
RATE MATCH AROUND SET B OF LTE CRS PATTERNS

TRP1

TRP2

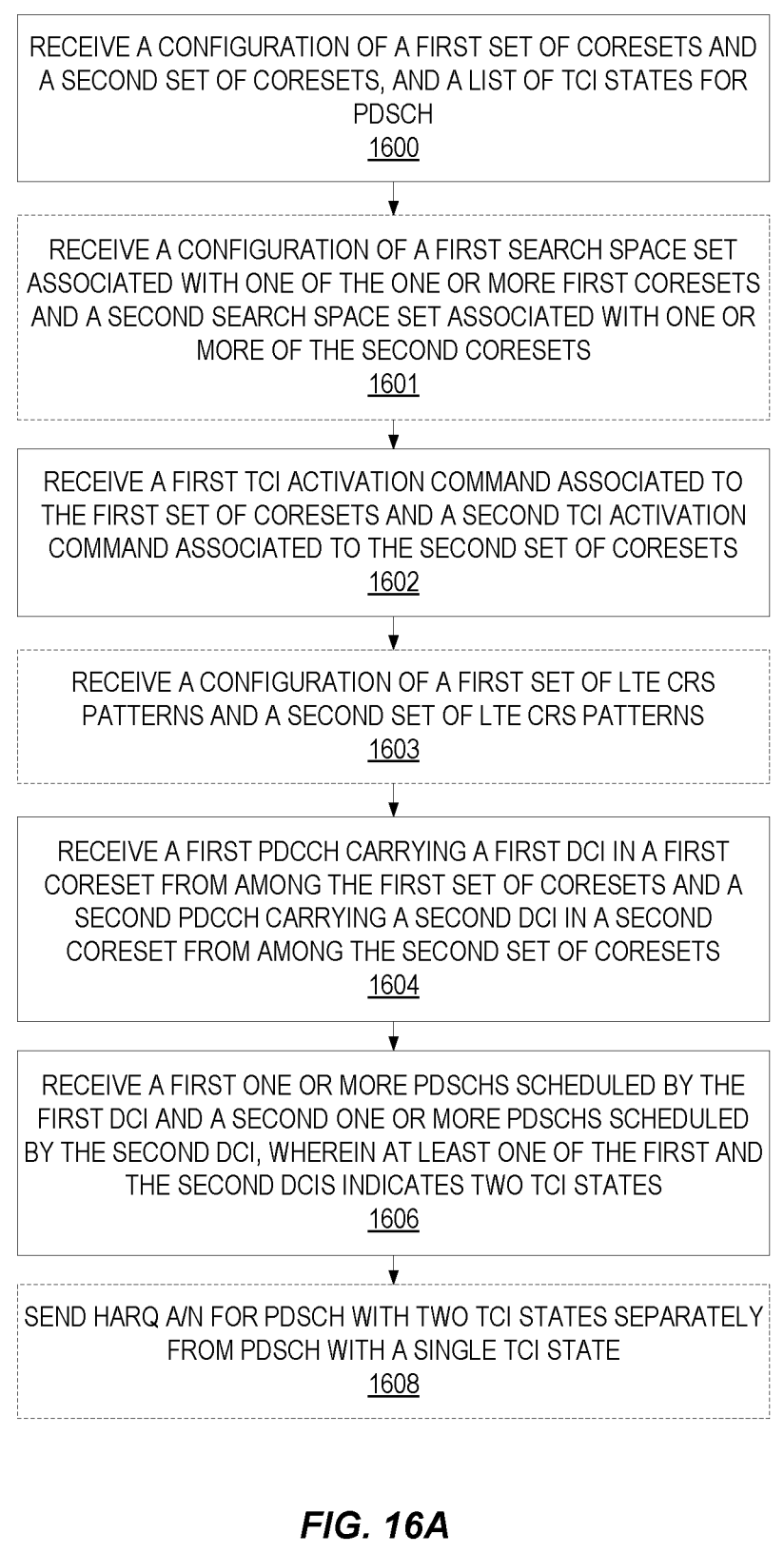

RECEIVE A CONFIGURATION OF A FIRST SET OF CORESETS AND A SECOND SET OF CORESETS, AND A LIST OF TCI STATES FOR PDSCH
1600

RECEIVE A CONFIGURATION OF A FIRST SEARCH SPACE SET ASSOCIATED WITH ONE OF THE ONE OR MORE FIRST CORESETS AND A SECOND SEARCH SPACE SET ASSOCIATED WITH ONE OR MORE OF THE SECOND CORESETS
1601

RECEIVE A FIRST TCI ACTIVATION COMMAND ASSOCIATED TO THE FIRST SET OF CORESETS AND A SECOND TCI ACTIVATION COMMAND ASSOCIATED TO THE SECOND SET OF CORESETS
1602

RECEIVE A CONFIGURATION OF A FIRST SET OF LTE CRS PATTERNS AND A SECOND SET OF LTE CRS PATTERNS
1603

RECEIVE A FIRST PDCCH CARRYING A FIRST DCI IN A FIRST CORESET FROM AMONG THE FIRST SET OF CORESETS AND A SECOND PDCCH CARRYING A SECOND DCI IN A SECOND CORESET FROM AMONG THE SECOND SET OF CORESETS
1604

RECEIVE A FIRST ONE OR MORE PDSCHS SCHEDULED BY THE FIRST DCI AND A SECOND ONE OR MORE PDSCHS SCHEDULED BY THE SECOND DCI, WHEREIN AT LEAST ONE OF THE FIRST AND THE SECOND DCIS INDICATES TWO TCI STATES
1606

SEND HARQ A/N FOR PDSCH WITH TWO TCI STATES SEPARATELY FROM PDSCH WITH A SINGLE TCI STATE
1608

*FIG. 16A*

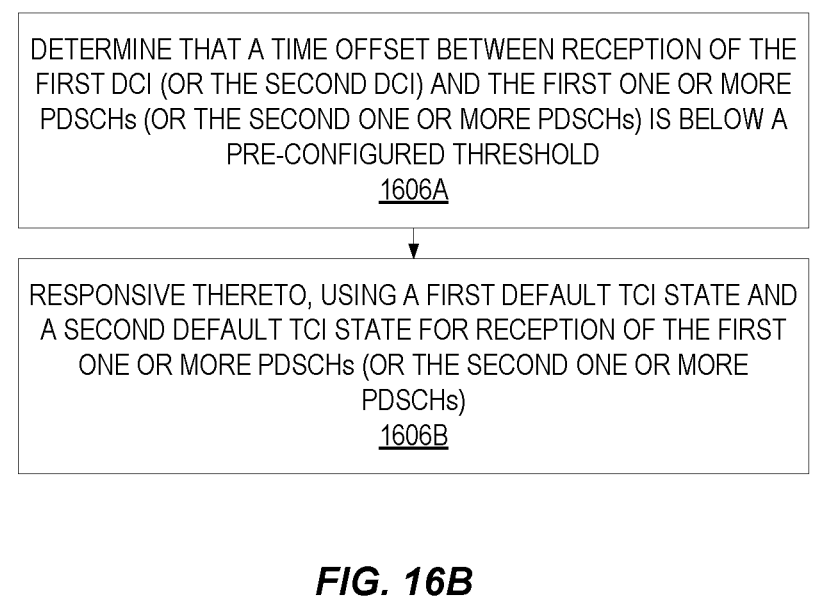

DETERMINE THAT A TIME OFFSET BETWEEN RECEPTION OF THE FIRST DCI (OR THE SECOND DCI) AND THE FIRST ONE OR MORE PDSCHs (OR THE SECOND ONE OR MORE PDSCHs) IS BELOW A PRE-CONFIGURED THRESHOLD
1606A

RESPONSIVE THERETO, USING A FIRST DEFAULT TCI STATE AND A SECOND DEFAULT TCI STATE FOR RECEPTION OF THE FIRST ONE OR MORE PDSCHs (OR THE SECOND ONE OR MORE PDSCHs)
1606B

*FIG. 16B*

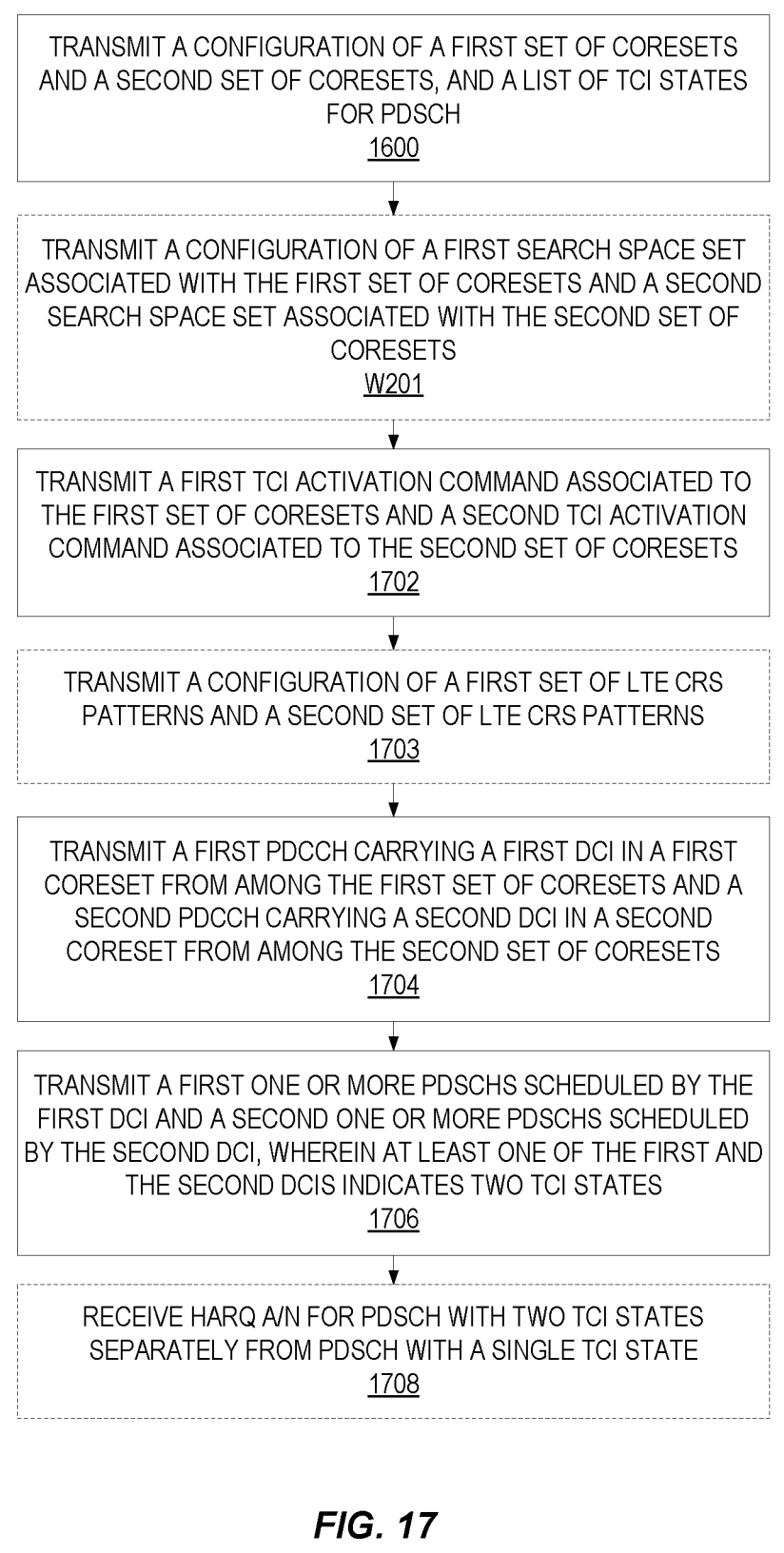

TRANSMIT A CONFIGURATION OF A FIRST SET OF CORESETS
AND A SECOND SET OF CORESETS, AND A LIST OF TCI STATES
FOR PDSCH
1600

TRANSMIT A CONFIGURATION OF A FIRST SEARCH SPACE SET
ASSOCIATED WITH THE FIRST SET OF CORESETS AND A SECOND
SEARCH SPACE SET ASSOCIATED WITH THE SECOND SET OF
CORESETS
W201

TRANSMIT A FIRST TCI ACTIVATION COMMAND ASSOCIATED TO
THE FIRST SET OF CORESETS AND A SECOND TCI ACTIVATION
COMMAND ASSOCIATED TO THE SECOND SET OF CORESETS
1702

TRANSMIT A CONFIGURATION OF A FIRST SET OF LTE CRS
PATTERNS AND A SECOND SET OF LTE CRS PATTERNS
1703

TRANSMIT A FIRST PDCCH CARRYING A FIRST DCI IN A FIRST
CORESET FROM AMONG THE FIRST SET OF CORESETS AND A
SECOND PDCCH CARRYING A SECOND DCI IN A SECOND
CORESET FROM AMONG THE SECOND SET OF CORESETS
1704

TRANSMIT A FIRST ONE OR MORE PDSCHS SCHEDULED BY THE
FIRST DCI AND A SECOND ONE OR MORE PDSCHS SCHEDULED
BY THE SECOND DCI, WHEREIN AT LEAST ONE OF THE FIRST AND
THE SECOND DCIS INDICATES TWO TCI STATES
1706

RECEIVE HARQ A/N FOR PDSCH WITH TWO TCI STATES
SEPARATELY FROM PDSCH WITH A SINGLE TCI STATE
1708

*FIG. 17*

MIXED SIGNAL DCI AND MULTI-DCI FOR PDSCH SCHEDULING

RELATED APPLICATIONS

This application is a 35 U.S.C. § 371 national phase filing of International Application No. PCT/IB2021/052547, filed Mar. 26, 2021, which claims the benefit of provisional patent application Ser. No. 63/000,887, filed Mar. 27, 2020, the disclosures of which are hereby incorporated herein by reference in their entireties.

TECHNICAL FIELD

The present disclosure relates to single Downlink Control Information (DCI) and multi-DCI Physical Downlink Shared Channel (PDSCH) scheduling in a wireless network.

BACKGROUND

The next generation mobile wireless communication system (5G), or new radio (NR), will support a diverse set of use cases and a diverse set of deployment scenarios. The later includes deployment at both low frequencies (below 6 Gigahertz (GHz)) and very high frequencies (up to 10's of GHz).

NR Frame Structure and Resource Grid

NR uses Cyclic Prefix Orthogonal Frequency Division Multiplexing (CP-OFDM) in both downlink (i.e., from a network node (gNB) or base station to a user equipment (UE)) and uplink (i.e., from UE to gNB). Discrete Fourier Transform (DFT) spread Orthogonal Frequency Division Multiplexing (OFDM) is also supported in the uplink. In the time domain, NR downlink and uplink are organized into equally sized subframes of 1 millisecond (ms) each. A subframe is further divided into multiple slots of equal duration. The slot length depends on subcarrier spacing. For subcarrier spacing of $\Delta f=15$ kHz, there is only one slot per subframe and each slot consists of 14 OFDM symbols.

Data scheduling in NR is typically in slot basis. An example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^{\mu})$ kHz where $\mu \in 0$, 1, 2, 3, 4. $\Delta f=15$ kHz is the basic subcarrier spacing. The slot durations at different subcarrier spacings is given by $1/2^{\mu}$ ms.

In the frequency domain, a system bandwidth is divided into Resource Blocks (RBs), each corresponding to twelve contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one resource element (RE).

Downlink transmissions are dynamically scheduled, i.e., in each slot the gNB transmits Downlink Control Information (DCI) over Physical Downlink Control Channel (PDCCH) about which UE data is to be transmitted to and which RBs in the current downlink slot the data is transmitted on. The UE data transmissions are carried on PDSCH.

There are three DCI formats defined for scheduling PDSCH in NR, i.e., DCI format 1_0, DCI format 1_1, and DCI format 1_2. DCI format 1_0 has a smaller size than DCI 1_1 and can be used when a UE is not connected to the network, while DCI format 1_1 can be used for scheduling Multiple-Input-Multiple-Output (MIMO) transmissions with up to two Transport Blocks (TBs). DCI format 1_2 is introduced in NR Release 16 (Rel-16) to support configurable size for certain bit fields in the DCI.

A UE first detects and decodes PDCCH and, if the decoding is successful, it then decodes the corresponding PDSCH based on the decoded DCI carried in the PDCCH.

Uplink data transmissions are also dynamically scheduled using PDCCH. Similar to downlink, a UE first decodes an uplink grant in a PDCCH and then transmits data over a PUSCH based the decoded control information in the uplink grant such as modulation order, coding rate, uplink resource allocation, etc.

QCL

Several signals can be transmitted from different antenna ports of a same base station at a same or different time. If these signals have the same large-scale properties such as Doppler shift/spread, average delay spread, or average delay, these antenna ports are said to be Quasi Co-Located (QCL) with respect to the large-scale properties.

If a UE knows that two antenna ports are QCL with respect to a certain parameter (e.g., Doppler spread), the UE can estimate that parameter based on a first antenna port and apply that estimate for receiving signal on the second antenna port. Typically, a measurement Reference Signal (RS) such as Non-Zero Power Channel State Information Reference Signal (NZP CSI-RS) or Synchronization Signal Block (SSB), known as source RS, is sent on the first antenna and another signal such as a Demodulation Reference Signal (DMRS), known as target RS, is sent on the second antenna port.

For instance, if antenna ports A and B are QCL with respect to average delay, the UE can estimate the average delay from the signal received from antenna port A and assume that the signal received from antenna port B has the same average delay. This is useful for demodulation because in some scenarios, certain channel properties cannot be reliably estimated based on signals (e.g., DMRS) received on port B. With the QCL relation, the UE can first measure certain channel properties on antenna port A and apply an appropriate channel estimation filter when receiving signals on antenna port B.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management in frequency range 2 (FR2) and is known as spatial QCL. There is currently no strict definition of spatial QCL, but the understanding is that if two transmitted antenna ports are spatially QCL, the UE can use the same Rx beam to receive them.

TCI States

QCL relation between two RS is signaled to a UE through so called Transmission Configuration Indicator (TCI) states. Each TCI state can contain one or two source RS and associated QCL type. For example, a TCI state may contain a pair of source RS and QCL types, i.e., {NZP CSI-RS1, QCL Type A} and {NZP CSI-RS2, QCL Type D}. In this example, the UE can derive Doppler shift, Doppler spread, average delay, and delay spread from NZP CSI-RS1 and Spatial receive (Rx) parameter (i.e., the Rx beam to use) from NZP CSI-RS2.

A TCI state can be interpreted as a possible beam transmitted from the network or a possible Transmission/Reception Point (TRP) used by the network to communicate with the UE.

A UE can be configured through Radio Resource Control (RRC) signaling with up to 8 TCI states in FR1 and 128 TCI states in FR2 for PDSCH, depending on UE capability. Up to 8 TCI states per Bandwidth Part (BWP) per serving cell may be activated by Medium Access Control (MAC) Control Element (CE). The UE determines QCL for a PDSCH reception based on the TCI-State(s) indicated in the 'Transmission Configuration Indication' field in a DCI scheduling the PDSCH. A mapping between a TCI codepoint in DCI and one or two TCI states is provided in the enhanced PDSCH MAC CE that activates the TCI states.

For single DCI based PDSCH transmission over multi-TRP, an enhanced MAC CE is introduced in NR Rel-16 as shown in FIG. 3, where field "$C_i$" indicates whether the octet containing TCI state $ID_{i,2}$ is present. If this field is set to "1", the octet containing TCI state $ID_{i,2}$ is present. Otherwise, the octet containing TCI state $ID_{i,2}$ is not present. The field "TCI state $ID_{i,j}$" indicates an activated TCI state where i is the index of the codepoint of the DCI Transmission configuration indication field in DCI as specified in 3GPP TS 38.212 and TCI state $ID_{i,j}$ denotes the $j^{th}$ TCI state indicated for the $i^{th}$ codepoint in the DCI Transmission Configuration Indication field in DCI. The first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1, and so on. The TCI state $ID_{i,2}$ is optional based on the indication of the $C_i$ field. The maximum number of activated TCI codepoints is 8, and the maximum number of TCI states mapped to a TCI codepoint is 2. Field "R" is a reserved bit and set to "0".

Coreset

A UE monitors a set of PDCCH candidates in one or more Control Resource Sets (CORESETs) on an active downlink (DL) BWP on each activated serving cell configured with PDCCH monitoring according to corresponding search space sets, where monitoring implies decoding each PDCCH candidate according to the monitored DCI formats.

A PDCCH candidate can occupy one or more Control-Channel Elements (CCEs), also referred to as Aggregation Levels (ALs), as indicated in Table 1 below. A CCE consists of 6 Resource-Element Groups (REGs), where a REG equals one RB during one OFDM symbol.

TABLE 1

| NR supported PDCCH aggregation levels. | |
| --- | --- |
| Aggregation level | Number of CCEs |
| 1 | 1 |
| 2 | 2 |
| 4 | 4 |
| 8 | 8 |
| 16 | 16 |

A set of PDCCH candidates for a UE to monitor is defined in terms of PDCCH search space sets. A search space set can be a Common Search Space (CSS) set or a UE Specific Search Space (USS) set. A UE can be configured with up to 10 sets of search spaces per BWP for monitoring PDCCH candidates.

A search space set is defined over a CORESET. A CORESET consists of $N_{symb}^{CORESET}$ resource blocks in the frequency domain and $N_{symb}^{CORESET} \in \{1, 2, 3\}$ consecutive OFDM symbols in the time domain. For each DL BWP configured to a UE in a serving cell, a UE can be provided by higher layer signaling with P≤5 CORESETs. For each CORESET, a UE is configured by RRC signaling with CORESET Information Element (IE), which includes the following:

ControlResourceSetId: a CORESET index p, 0≤p<16;

a DM-RS scrambling sequence initialization value;

a list of up to 64 TCI-States can be configured in a CORESET p;

an indication for a presence or absence of a transmission configuration indication (TCI) field for DCI format 1_1 transmitted by a PDCCH in CORESET p. The corresponding field for indicating a presence or absence of a TCI field for DCI format 1_2 is given by 'tci-PresentInDCI-ForDCIFormat1_2'.

For each CORESET, one TCI state is activated by MAC CE.

Single DCI Based DL Data Transmission Over Multiple TRPs

A PDSCH may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI. The network configures the UE with multiple TCI states via RRC. Whether a codepoint in the TCI field is mapped to one or two TCI states is provided by the enhanced PDSCH MAC CE that activates the TCI states.

One example of PDSCH transmission over two TRPs is shown in FIG. 4, where different layers of a code word (CW) of a PDSCH are sent over two TRPs, each associated with a different TCI state. In this case, two DMRS ports, one for each layer, in two Code Division Multiplexing (CDM) groups are also signaled to the UE. A first TCI state is associated with the DMRS port in a first CDM group, and a second TCI state is associated with the DMRS port in a second CDM group. This approach is often referred to as Non-Coherent Joint Transmission (NC-JT) or scheme 1a in NR Rel-16 3GPP discussions.

Transmitting PDSCH over multiple TRPs can also be used to improve PDSCH transmission reliability. A number of approaches are introduced in NR Rel-16 including "FDMSchemeA", "FDMSchemeB", "TDMSchemeA"; "TDMSchemeB". An example of multi-TRP PDSCH transmission with FDMSchemeA is shown in FIG. 5, where a PDSCH is sent over TRP1 in Precoding RB Groups (PRGs) {0, 2, 4} and over TRP2 in PRGs {1,3,5}. The PDSCH is scheduled by a PDCCH which is sent over TRP1, i.e., associated with TCI state 1. FIG. 6 shows an example data transmission with FDMSchemeB in which PDSCH #1 is transmitted in PRGs {0, 2, 4} from TRP1 and PDSCH #2 for the same TB is transmitted in PRGs {1,3,5} from TRP2. The two PDSCHs carry the same encoded data payload but with a same or different redundancy version so that the UE can do soft combining of the two PDSCHs to achieve more reliable reception. FIG. 7 shows an example data transmission with TDMSchemeA in which PDSCH repetition occurs in mini slot of 4 OFDM symbols within a slot. Each PDSCH is associated with a different Redundant Version (RV). An example data transmission with TDMSchemeB is shown in FIG. 8, where 4 PDSCHs for a same TB are transmitted over 2 TRPs and in 4 consecutive slots. Each PDSCH is associated with a different RV. For all these schemes, a single DCI transmitted from one TRP is used to schedule multiple PDSCH transmissions over two TRPs.

Multi-DCI Based PDSCH Transmission with Multiple TRPs

In NR Rel-16, multi-DCI scheduling is also introduced for multi-TRP in which a UE may receive two DCIs each scheduling a PDSCH. Each PDCCH and PDSCH is transmitted from the same TRP. An example is shown FIG. 9, where PDSCH 1 is scheduled by PDCCH 1 from TRP1 and PDSCH 2 is scheduled by PDCCH 2 from TRP2. The two PDSCHs may be fully overlapping, partially overlapping, or non-overlapping in time and frequency. When the two PDSCHs are fully or partially overlapping, a same DMRS resource configuration is assumed with DMRS ports of the two PDSCHs in different CDM groups.

For multi-DCI operation, a UE needs to be configured with two CORESET pools, each associated with a TRP. Each CORESET pool is a collection of CORESETs that belongs to the same pool. A CORESET pool index can be configured in each CORESET with a value of 0 or 1. For the two DCIs in the above example, they are transmitted in two CORESETs belonging to different CORESET pools (i.e., with CORESETPoolIndex 0 and 1 respectively). The two PDSCHs belong to two different Hybrid Automatic Repeat Request (HARQ) processes.

For multi-DCI based PDSCH scheduling, TCI state activation and mapping to codepoints of the TCI field in DCI is done per CORESET pool and only a single TCI state can be mapped to a codepoint of TCI field in DCI. This means that a DCI sent in a CORESET pool can only schedule a PDSCH from one TRP. The corresponding TCI state activation/deactivation PDSCH MAC CE is shown in FIG. 10, where the TCI state with TCI-StateId i is activated and mapped to the codepoint of the DCI Transmission Configuration Indication field if the $T_i$ field is set to 1 and deactivated if the $T_i$ field is set to 0. The codepoint to which the TCI State is mapped is determined by its ordinal position among all the TCI States with $T_i$ field set to 1, i.e., the first TCI State with $T_i$ field set to 1 shall be mapped to the codepoint value 0, second TCI State with $T_i$ field set to 1 is mapped to the codepoint value 1, and so on. The maximum number of activated TCI states is 8 per CORESET pool.

When the field "CORESET Pool ID" is set to 1, it indicates that this MAC CE shall be applied for the DL transmission scheduled from CORESETs with the CORESET pool ID=1; otherwise, this MAC CE shall be applied for the DL transmission scheduled from CORESETs with absence of the CORESET pool ID or with the CORESET pool ID=0.

Default TCI State(s)

If no TCI codepoints are mapped to two different TCI states and the offset between the reception of a DL DCI and the corresponding PDSCH is less than a threshold timeDurationForQCL configured by higher layers, instead of using the TCI state indicated in the TCI field in the DCI, the UE may assume that the TCI state for the PDSCH is given by the TCI state activated for a CORESET associated with a monitored search space with the lowest ControlResourceSetId in the latest slot in which one or more CORESETs within the active BWP of the serving cell are monitored by the UE. The TCI state is referred here as the default TCI state. If none of configured TCI states for the serving cell of scheduled PDSCH contains 'QCL-TypeD', the UE shall obtain the other QCL assumptions from the TCI states indicated by DCI for its scheduled PDSCH irrespective of the time offset between the reception of the DL DCI and the corresponding PDSCH.

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint is configured with two TCI states, the UE may assume that the TCI states for the PDSCH is given by the TCI states corresponding to the lowest codepoint among the TCI codepoints containing two different TCI states. In this case, the two TCI states are the default TCI states.

A default TCI state corresponds to a Rx beam at a UE and is used by the UE to receive a PDSCH before the corresponding DCI is decoded. Otherwise, a wrong Rx beam could be used and the PDSCH could be lost if the time offset between the DCI and the PDSCH, which is unknown before the DCI is decoded, is below the threshold.

PDSCH Scheduling Restrictions

In single DCI based PDSCH scheduling, there is a number of scheduling restrictions:

1. For any HARQ process ID(s) in a cell, the UE is not expected to receive a PDSCH that overlaps in time with another PDSCH;
2. A UE is not expected to receive another PDSCH for a given HARQ process until after the end of the expected transmission of HARQ-ACK for that HARQ process.

In multi-DCI based scheduling, the above scheduling restrictions apply on a per CORESET pool basis.

Rate Matching Around LTE CRS

In NR Rel-16, a UE can be configured with two sets of Long Term Evolution (LTE) Cell specific Reference Signal (CRS) pattern(s) per BWP per serving cell. Each of the two sets may be associated with a CORESET pool. A PDSCH scheduled by a PDCCH received in a CORESET belong a CORESET pool may be rate matched around the corresponding set of LTE CRS pattern(s), depending on UE capability. Rate matching here means that the associated REs of the LTE CRS pattern(s) are considered unavailable for the PDSCH.

DMRS Port(s) Indication in DCI

For dynamically scheduled or semi-persistently scheduled (SPS) PDSCH, the associated DMRS ports are indicated in an "antenna port(s)" field of the corresponding DCI. The "antenna port(s)" field points to a row of an antenna port table containing information about the antenna ports $\{p_0, \ldots, p_{\upsilon-1}\}$ and the number of CDM groups without data, where u is the number of DMRS ports. The antenna ports $\{p_0, \ldots, p_{\upsilon-1}\}$ shall be determined according to the ordering of DMRS port(s) given by Tables 7.3.1.2.2-1/2/3/4 or Tables 7.3.1.2.2-1A/2A/3A/4A in 3GPP TS 38.212.

SUMMARY

Systems and methods for mixed signal Downlink Control Information (DCI) and multi-DCI for Physical Downlink Shared Channel (PDSCH) scheduling are disclosed. In one embodiment, a method of performed by a User Equipment (UE) for reception of a data transmission in a wireless network comprises receiving, from a network node, a configuration of a first set of Control Resource Sets (CORE-SETs) and a second set of CORESETs, and a list of Transmission Configuration Indication (TCI) states for PDSCH. The first set of CORESETs comprises one or more first CORESETs and the second set of CORESETs comprises one or more second CORESETs. The method further comprises receiving, from a network node, a first TCI activation command associated to the first set of CORESETs and a second TCI activation command associated to the second set of CORESETs. The first TCI activation command activates a first subset of TCI states from the list of TCI states to provide first activated TCI states and maps the first activated TCI states to a set of TCI codepoints, and the second TCI activation command activates a second subset of the TCI states from the list of TCI states to provide second activated TCI states and maps the second activated TCI states to the set of TCI codepoints. The method further comprises receiving a first Physical Downlink Control Channel (PDCCH) carrying a first DCI in a first CORESET from among the first set of CORESETs and a second PDCCH carrying a second DCI in a second CORESET from among the second set of CORESETs. The method further comprises receiving a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b).

In one embodiment, the first one or more PDSCHs and the second one or more PDSCHs are fully overlapping, partially overlapping, or non-overlapping in time, but do not overlap in frequency.

In one embodiment, the first one or more PDSCHs and the second one or more PDSCHs fully or partially overlap in time, a subset of the first activated TCI states that is mapped to the one of the set of TCI codepoints comprised in the first DCI, and a subset of the second activated TCI states that is mapped to the one of the set of TCI codepoints comprised in the second DCI share at least one TCI state in common.

In one embodiment, when a time offset between reception of the first DCI and the first one or more PDSCHs is below a pre-configured threshold, a first and second default TCI states are used for reception of the first one or more PDSCHs.

In one embodiment, when a time offset between reception of the second DCI and the second one or more PDSCHs is below a pre-configured threshold, a first and second default TCI states are used for reception of the second one or more PDSCHs.

In one embodiment, receiving the first one or more PDSCHs scheduled by the first DCI and the second one or more PDSCHs scheduled by the second DCI comprises determining that a time offset between reception of the first DCI and the first one or more PDSCHs is below a pre-configured threshold and, responsive thereto, using a first and second default TCI states for reception of the first one or more PDSCHs.

In one embodiment, receiving the first one or more PDSCHs scheduled by the first DCI and the second one or more PDSCHs scheduled by the second DCI comprises determining that a time offset between reception of the second DCI and the second one or more PDSCHs is below a pre-configured threshold and, responsive thereto, using a first and second default TCI states for reception of the second one or more PDSCHs.

In one embodiment, the first default TCI state is associated to a first CORESET with a lowest CORESET identity among the first set of CORESETs within an active bandwidth part of a serving cell monitored by the UE, and the second default TCI state is associated to a second CORESET with a lowest CORESET identity among the second set of CORESETs within an active bandwidth part of a serving cell monitored by the UE.

In one embodiment, the first and second default TCI states are TCI states corresponding to a lowest codepoint among TCI codepoints containing two different TCI states in the first TCI activation command or the second TCI activation command.

In one embodiment, the method further comprises dividing the list of TCI states into a first set of TCI states and a second set of TCI states, wherein the first set of TCI states is associated to the first set of CORESETs and the second set of TCI states is associated to the second set of CORESETs.

In one embodiment, the method further comprises receiving a configuration of a first set of Long Term Evolution (LTE) Cell-specific Resource Signal (CRS) patterns and a second set of LTE CRS patterns. In one embodiment, a PDSCH with two TCI states is rate matched around the union of the first and the second sets of LTE CRS patterns, the PDSCH being one of the first one or more PDSCHs or one of the second one or more PDSCHs. In another embodiment, a PDSCH with one TCI state is rate matched around the first or the second set of LTE CRS patterns if the TCI state belongs to the first or the second set of TCI states, the PDSCH being one of the first one or more PDSCHs or one of the second one or more PDSCHs. In another embodiment, a PDSCH is configured with one TCI state and this one TCI state belongs to the first or the second set of TCI states, and the PDSCH is rate matched around the first or the second set of LTE CRS patterns.

In one embodiment, the method further comprises sending Hybrid Automatic Repeat Request (HARQ) Acknowledgement/Negative Acknowledgement (A/N) feedback for PDSCH with two TCI states separately from PDSCH with a single TCI state.

In one embodiment, the method further comprises receiving a configuration of a first search space set associated with one of the CORESETs in the first set of CORESETs and a second search space set associated with one of the CORE-SETs in the second set of CORESETs. In one embodiment, the first DCI is received in the first search space set, and the second DCI is received in the second search space set.

Corresponding embodiments of a UE are also disclosed. In one embodiment, a UE for reception of a data transmission in a wireless network is adapted to receive, from a network node, a configuration of a first set of CORESETs and a second set of CORESETs, and a list of TCI states for PDSCH. The first set of CORESETs comprises one or more first CORESETs and the second set of CORESETs comprises one or more second CORESETs. The UE is further adapted to receive, from a network node, a first TCI activation command associated to the first set of CORESETs and a second TCI activation command associated to the second set of CORESETs. The first TCI activation command activates a first subset of TCI states from the list of TCI states to provide first activated TCI states and maps the first activated TCI states to a set of TCI codepoints. The second TCI activation command activates a second subset of the TCI states from the list of TCI states to provide second activated TCI states and maps the second activated TCI states to the set of TCI codepoints. The UE is further adapted to receive a first PDCCH carrying a first DCI in a first CORESET from among the first set of CORESETs and a second PDCCH carrying a second DCI in a second CORESET from among the second set of CORESETs. The UE is further adapted to receive a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b).

In one embodiment, a UE for reception of a data transmission in a wireless network comprises one or more transmitters, one or more receivers, and processing circuitry associated with the one or more transmitters and the one or more receivers. The processing circuitry is configured to cause the UE to receive, from a network node, a configuration of a first set of CORESETs and a second set of CORESETs, and a list of TCI states for PDSCH. The first set of CORESETs comprises one or more first CORESETs and the second set of CORESETs comprises one or more second CORESETs. The processing circuitry is further configured to cause the UE to receive, from a network node, a first TCI activation command associated to the first set of CORESETs and a second TCI activation command associated to the second set of CORESETs. The first TCI activation command activates a first subset of TCI states from the list of TCI states to provide first activated TCI states and maps the first activated TCI states to a set of TCI codepoints. The second TCI activation command activates a second subset of the TCI states from the list of TCI states to provide second activated TCI states and maps the second activated TCI states to the set of TCI codepoints. The processing circuitry is further configured to cause the UE to receive a first PDCCH carrying a first DCI in a first CORESET from among the first set of CORESETs and a second PDCCH carrying a second DCI in a second CORESET from among the second set of CORESETs. The processing circuitry is further configured to cause the UE to receive a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b).

Embodiments of a method performed by one or more network nodes for data transmission in a wireless network are also disclosed. In one embodiment, the method comprises transmitting, to a UE, a configuration of a first set of CORESETs and a second set of CORESETs, and a list of TCI states for PDSCH. The first set of CORESETs comprises one or more first CORESETs, and the second set of CORESETs comprises one or more second CORESETs. The method further comprises transmitting, to the UE, a first TCI activation command associated to the first set of CORESETs and a second TCI activation command associated to the second set of CORESETs. The first TCI activation command activates a first subset of TCI states from the list of TCI states to provide first activated TCI states and maps the first activated TCI states to a set of TCI codepoints. The second TCI activation command activates a second subset of the TCI states from the list of TCI states to provide second activated TCI states and maps the second activated TCI states to the set of TCI codepoints. The method further comprises transmitting, to the UE, a first PDCCH carrying a first DCI in a first CORESET from among the first set of CORESETs and a second PDCCH carrying a second DCI in a second CORESET from among the second set of CORESETs. The method further comprises transmitting, the UE, a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b).

Corresponding embodiments of a system comprising one or more network nodes for data transmission in a wireless network are also disclosed. In one embodiment, the system is adapted to transmit, to a UE, a configuration of a first set of CORESETs and a second set of CORESETs, and a list of TCI states for PDSCH. The first set of CORESETs comprises one or more first CORESETs, and the second set of CORESETs comprises one or more second CORESETs. The system is further adapted to transmit, to the UE, a first TCI activation command associated to the first set of CORESETs and a second TCI activation command associated to the second set of CORESETs. The first TCI activation command activates a first subset of TCI states from the list of TCI states to provide first activated TCI states and maps the first activated TCI states to a set of TCI codepoints. The second TCI activation command activates a second subset of the TCI states from the list of TCI states to provide second activated TCI states and maps the second activated TCI states to the set of TCI codepoints. The system is further adapted to transmit, to the UE, a first PDCCH carrying a first DCI in a first CORESET from among the first set of CORESETs, and a second PDCCH carrying a second DCI in a second CORESET from among the second set of CORE-SETs. The system is further adapted to transmit, the UE, a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5 illustrates an example of multi-TRP PDSCH transmission with 3GPP NR Release 16 FDMSchemeA, where a PDSCH is sent over TRP1 in Precoding Resource Block (RB) Groups (PRGs) {0, 2, 4} and over TRP2 in PRGs {1, 3, 5};

FIG. 6 illustrates an example data transmission with 3GPP NR Release 16 FDMSchemeB in which PDSCH #1 is transmitted in PRGs {0, 2, 4} from TRP1 and PDSCH #2 for the same TB is transmitted in PRGs {1,3,5} from TRP2;

FIG. 13 shows an example where the CORESETPoolIndex is indicated as part of the MAC CE for activating/deactivating TCI states which allows two TCI states to be mapped to a single codepoint in the DCI Transmission Configuration Information field, in accordance with one embodiment of the present disclosure;

FIG. 15 illustrates an example in which a PDSCH with an indicated TCI state is rate matched around a set of Cell-specific Reference Signal (CRS) patterns associated with a Control Resource Set (CORESET) pool for which the TCI state is associated to, in accordance with one embodiment of the present disclosure;

FIG. 16A is a flow chart that illustrates the operation of a UE for reception of data transmission in accordance with at least some embodiments of the present disclosure;

FIG. 16B illustrates one example embodiment of step 1606 of FIG. 16A;

FIG. 17 is a flow chart that illustrates the operation of one or more network nodes (e.g., one or more TRPs) for data transmission in accordance with at least some embodiments of the present disclosure;

DETAILED DESCRIPTION

Figures 1, 2:
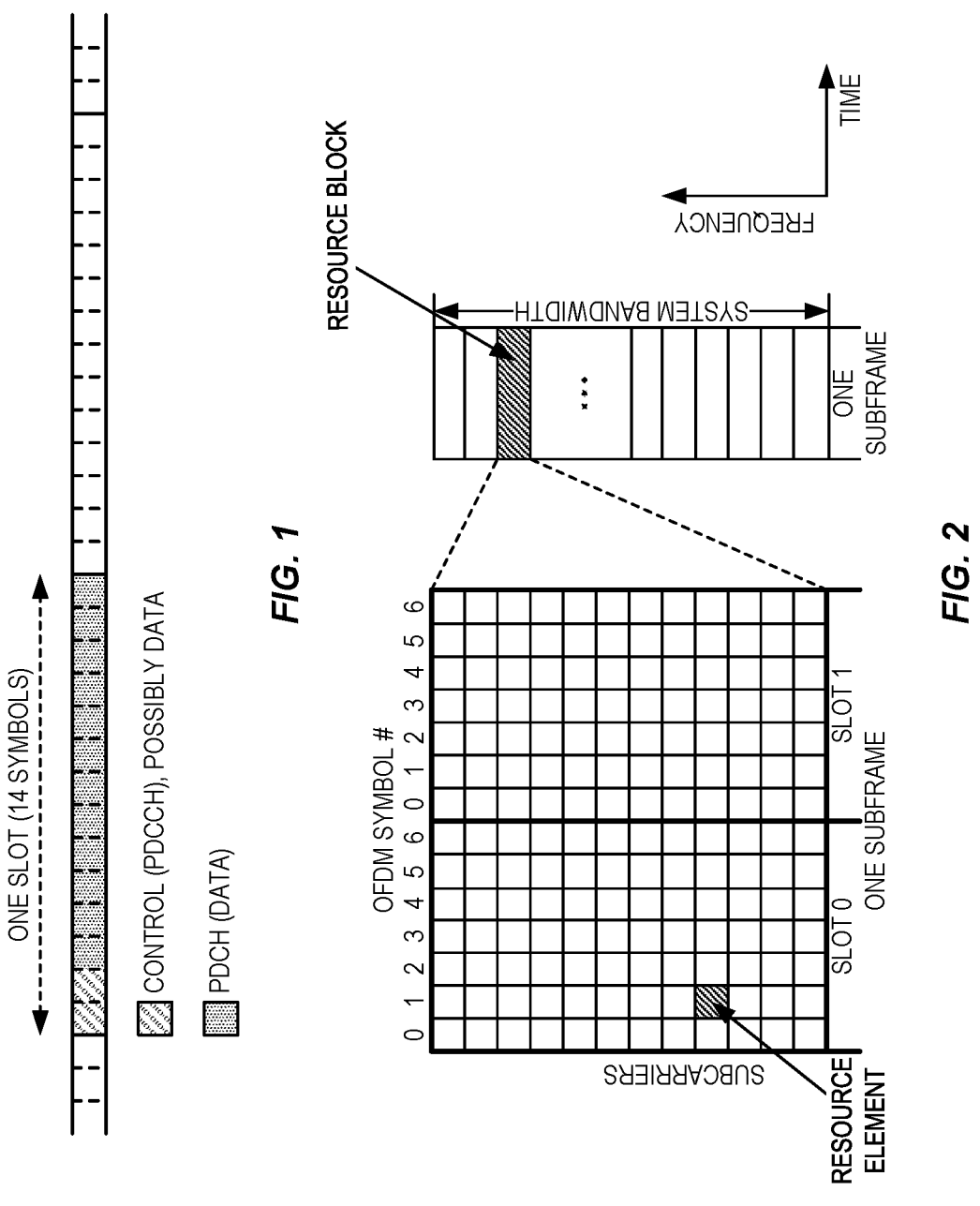
FIG. 1 illustrates an example of a Third Generation Partnership (3GPP) New Radio (NR) 14-symbol slot, where the first two symbols contain Physical Downlink Control Channel (PDCCH) and the rest of the symbols contain physical shared data channel contain either Physical Downlink Shared Channel (PDSCH) or Physical Uplink Shared Channel (PUSCH)
FIG. 2 illustrates the basic NR physical time-frequency resource grid.
Figure 3:
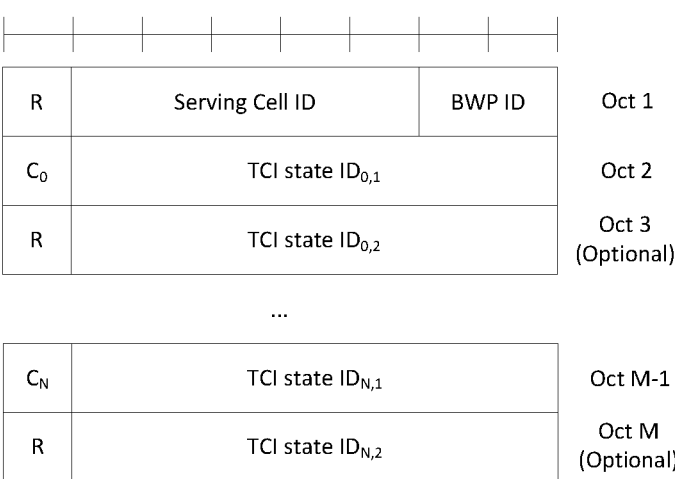
FIG. 3 illustrates an enhanced Medium Access Control (MAC) Control Element (CE) introduced in NR Release 16 for single Downlink Control Information (DCI) based PDSCH transmission over multiple Transmission/Reception Points (TRPs)
Figure 4:
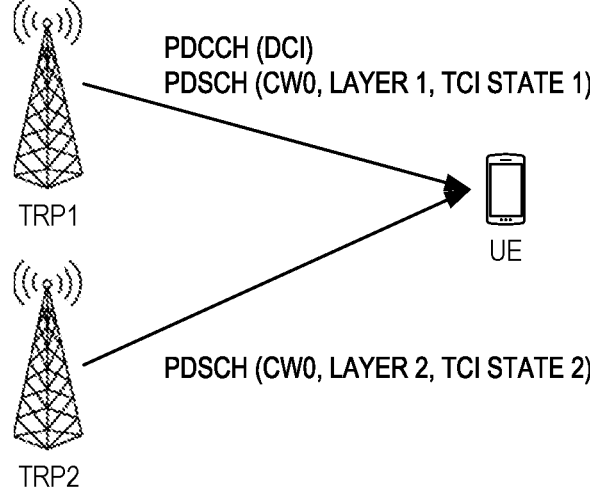
FIG. 4 illustrates one example of PDSCH transmission over two TRPs, where different layers of a code word (CW) of a PDSCH are sent over two TRPs, each associated with a different TCI state.
Figures 7, 8:
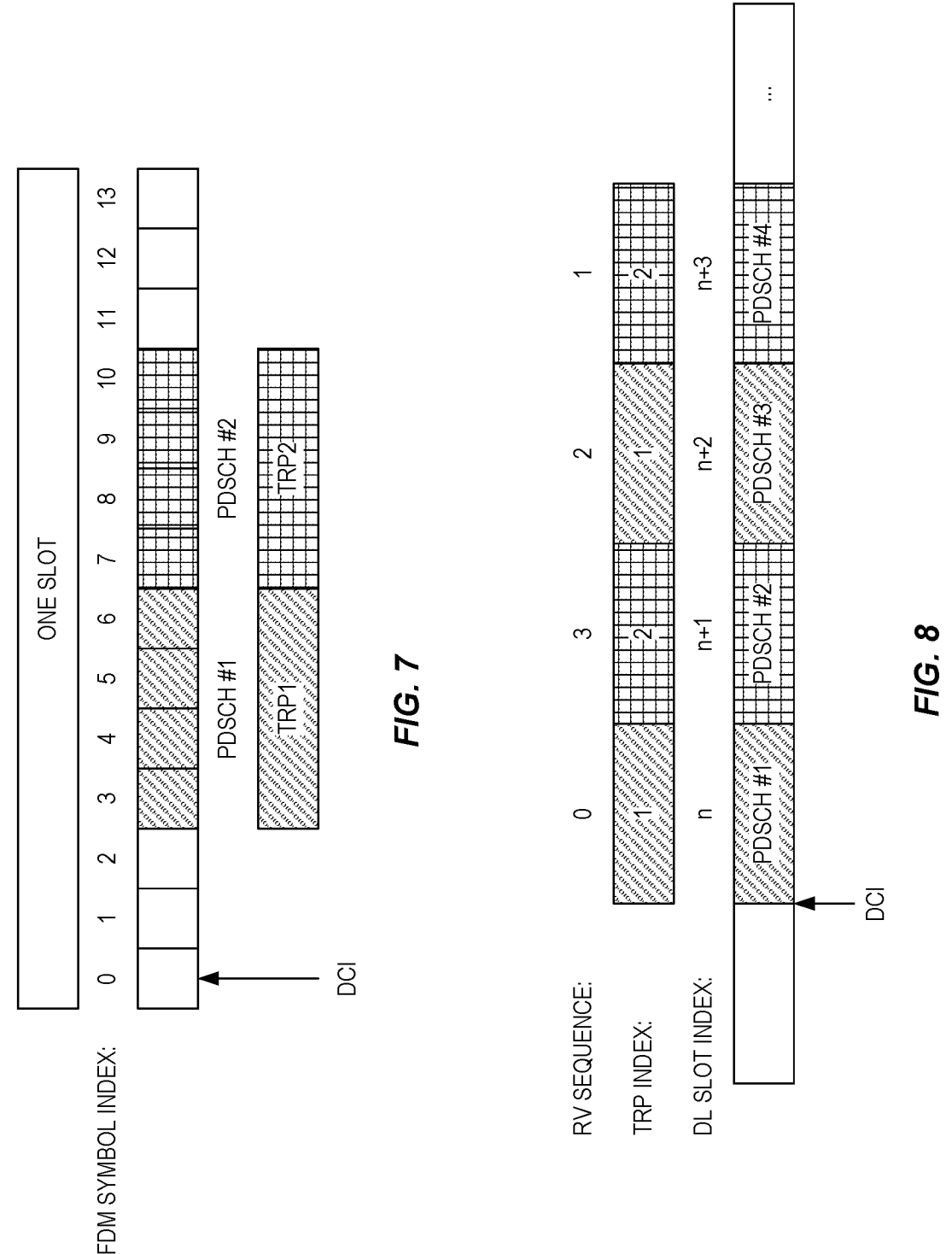
FIG. 7 shows an example data transmission with 3GPP NR Release 16 TDMSchemeA in which PDSCH repetition occurs in mini slot of four Orthogonal Frequency Division Multiplexing (OFDM) symbols within a slot.
FIG. 8 illustrates an example data transmission with 3GPP NR Release 16 TDMSchemeB, where four PDSCHs for a same Transport Block (TB) are transmitted over two TRPs and in four consecutive slots.
Figure 9:
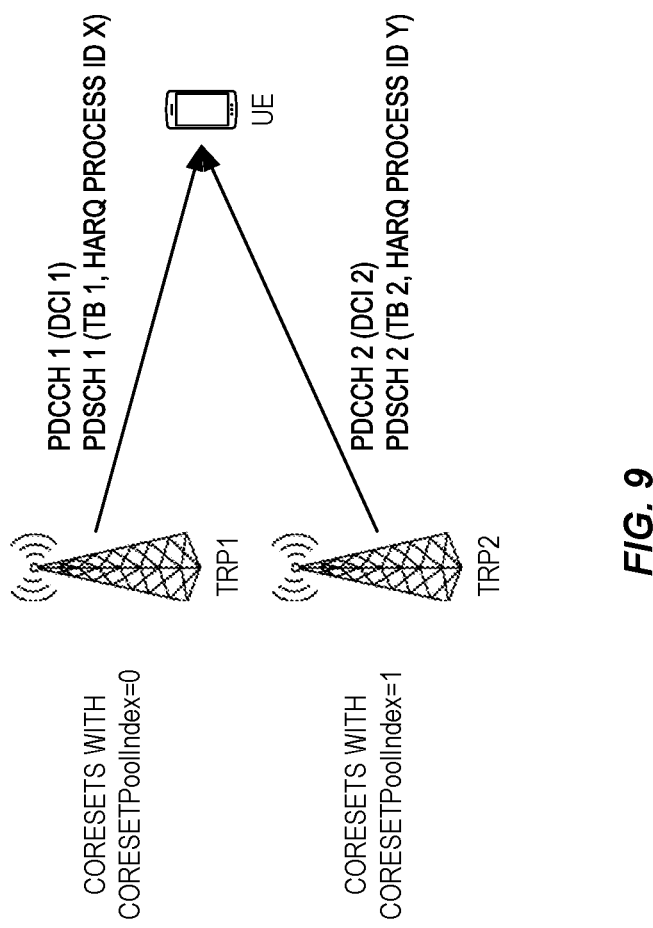
FIG. 9 illustrates an example of multi-DCI based PDSCH scheduling in 3GPP NR Release 16, where PDSCH 1 is scheduled by PDCCH 1 from TRP1 and PDSCH 2 is scheduled by PDCCH 2 from TRP2.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In existing NR, either single Downlink Control Information (DCI) based or multi-DCI based Physical Downlink Shared Channel (PDSCH) transmission over two TRPs can be configured for a UE. When multi-DCI is configured, a PDSCH cannot be transmitted over two TRPs and thus diversity transmission over two TRPs cannot be achieved, which is a problem for ultra-reliable communications. This creates a robustness problem, particularly in frequency range 2 (FR2) in which the link to a TRP could be suddenly blocked and thus data transmitted from the TRP could be lost.

To achieve reliable PDSCH transmission, one of the existing single DCI based PDSCH transmission schemes may be configured, as these schemes were designed for this purpose. However, due to the scheduling restriction with single DCI based transmission, only one PDSCH can be scheduled at a given time. This means that, if there are two types of traffic for the UE simultaneously with different quality of service requirements, for example one is enhanced Mobile Broadband (eMBB) with large packet sizes and the other is Ultra-Reliable and Low Latency Communication (URLLC) with small packet sizes, then the two types of traffic need to be scheduled in a Time Division Multiplexing (TDM) fashion. This sacrifices the URLLC traffic, which is sensitive to delays.

The fact that it is not possible to schedule URLLC and eMBB simultaneously is particularly problematic for FR2. In FR2, a single dedicated beam is typically used due to the use of analog transmit beamforming. This means that the whole bandwidth in the beam and in an OFDM symbol would be used for transmitting either eMBB or URLLC data but not both simultaneously and to only a single UE. Hence, not only do UEs need to be time multiplexed in different OFDM symbols (as multiple transmit beams cannot be used simultaneously) but also different traffic needs to be time multiplexed. This increases the latency further and lowers the spectral efficiency of the network, which is a problem. Also, for small URLLC packets, this time multiplexing becomes very inefficient as a small packet "locks up" resources and would result in very low spectrum efficiency.

Certain aspects of the present disclosure and their embodiments may provide solutions to the aforementioned or other challenges. Systems and methods are disclosed herein for mixed single DCI and multi-DCI based PDSCH scheduling in which single DCI based PDSCH may be scheduled from multiple TRPs in some slots while multi-DCI based PDSCH may be scheduled from a single TRP in other slots. In addition, embodiments of the proposed solutions allow that single DCI based PDSCH and multi-DCI based PDSCH may be scheduled in a same slot. Embodiments of the solutions described herein also introduce mechanisms for default Transmission Configuration Indication (TCI) states, rate matching, and Hybrid Automatic Repeat Request (HARQ) Acknowledgement/Negative Acknowledgement (A/N) in this new framework.

Certain embodiments may provide one or more of the following technical advantage(s). Embodiments described herein may enable multiple traffic categories served to the same UE to be transmitted using multiple TRPs simultaneously, where different categories have different reliability and/or latency requirements.

Figure 11:
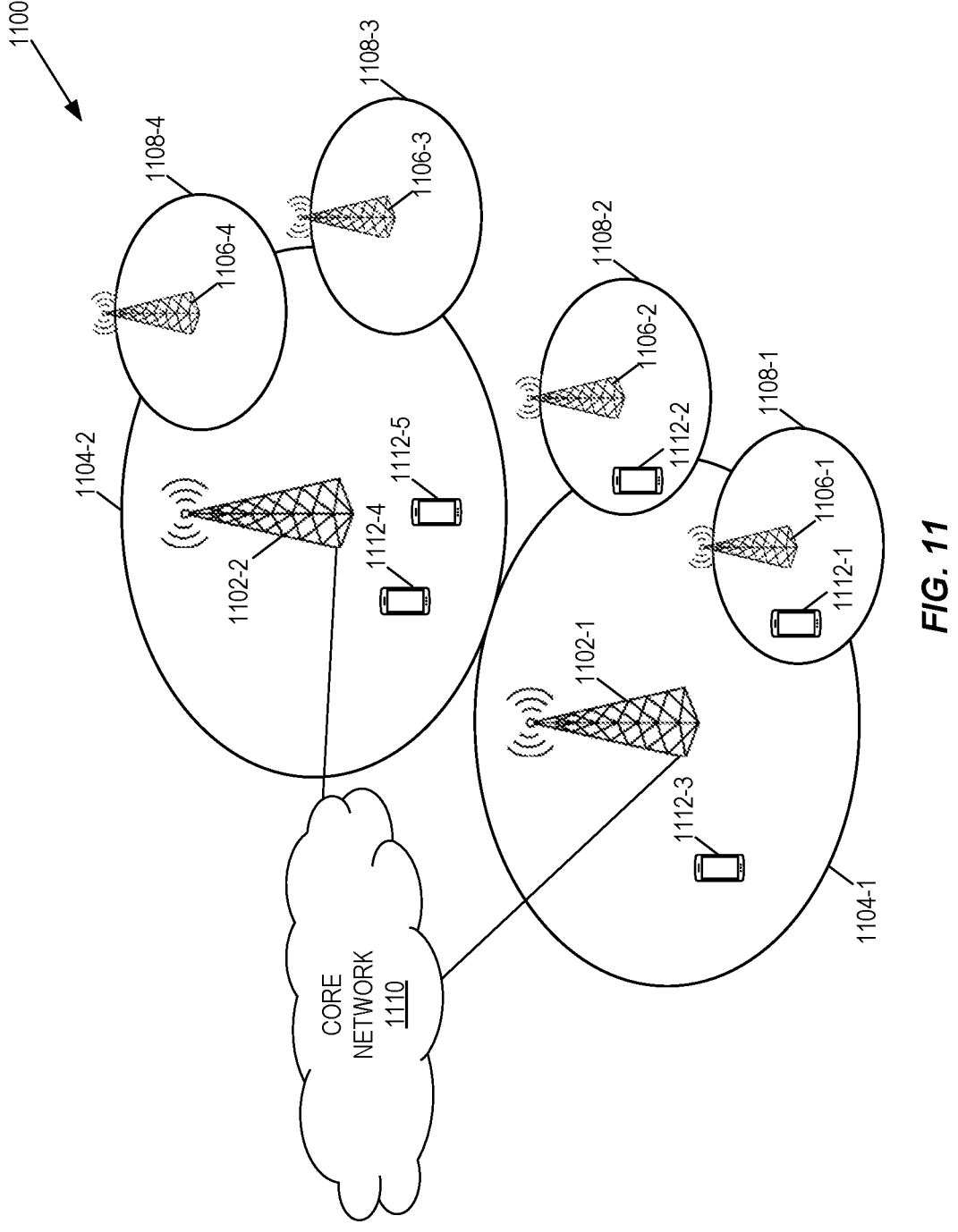
FIG. 11 illustrates one example of a cellular communications system in which embodiments of the present disclosure may be implemented.

In this regard, FIG. 11 illustrates one example of a cellular communications system 1100 in which embodiments of the present disclosure may be implemented. In the embodiments described herein, the cellular communications system 1100 is a 5G System (5GS) including a Next Generation RAN (NG-RAN). In this example, the NG-RAN includes base stations 1102-1 and 1102-2, which in the 5GS include NR base stations (referred to as gNBs) and, optionally, next generation eNBs (ng-eNBs) (e.g., LTE RAN nodes connected to the 5GC), controlling corresponding (macro) cells 1104-1 and 1104-2. The base stations 1102-1 and 1102-2 are generally referred to herein collectively as base stations 1102 and individually as base station 1102. Likewise, the (macro) cells 1104-1 and 1104-2 are generally referred to herein collectively as (macro) cells 1104 and individually as (macro) cell 1104. The RAN may also include a number of low power nodes 1106-1 through 1106-4 controlling corresponding small cells 1108-1 through 1108-4. The low power nodes 1106-1 through 1106-4 can be small base stations (such as pico or femto base stations) or Remote Radio Heads (RRHs), or the like. Notably, while not illustrated, one or more of the small cells 1108-1 through 1108-4 may alternatively be provided by the base stations 1102. The low power nodes 1106-1 through 1106-4 are generally referred to herein collectively as low power nodes 1106 and individually as low power node 1106. Likewise, the small cells 1108-1 through 1108-4 are generally referred to herein collectively as small cells 1108 and individually as small cell 1108. The cellular communications system 1100 also includes a core network 1110, which in the 5GS is referred to as the 5G Core (5GC). The base stations 1102 (and optionally the low power nodes 1106) are connected to the core network 1110.

The base stations 1102 and the low power nodes 1106 provide service to wireless communication devices 1112-1 through 1112-5 in the corresponding cells 1104 and 1108. The wireless communication devices 1112-1 through 1112-5 are generally referred to herein collectively as wireless communication devices 1112 and individually as wireless communication device 1112. In the following description, the wireless communication devices 1112 are oftentimes UEs and therefore referred to as UEs 1112, but the present disclosure is not limited thereto.

Now, a description of some example embodiments of the present disclosure will be provided. Note that while these embodiments are described under separate headings, these embodiments may be used separately or together in any desired combination unless explicitly stated or otherwise required.

Mixed Single DCI and Multi-DCI PDSCH Scheduling

In this embodiment, both single-DCI and multi-DCI based PDSCH scheduling (i.e., from multiple TRPs) are supported by a UE 1112, where the UE 1112 can dynamically be scheduled by either single-DCI framework or multi-DCI framework interchangeably (or simultaneously), without the need for higher layer reconfiguration (Medium Access Control (MAC) Control Element (CE) and/or Radio Resource Control (RRC)). In addition, simultaneous reception of two or more PDSCHs where at least one PDSCH is scheduled using single-DCI framework and at least one PDSCH is scheduled using multi-DCI framework is enabled. This UE behavior is denoted "mixed mode" herein.

In one embodiment, when a UE 1112 is configured with two Control Resource Set (CORESET) pools, the configuration of the UE 1112 in mixed mode may be enabled if: (a) the UE 1112 has indicated to the network (e.g., to the base station 1102) in UE capability signaling that the UE 1112 is capable of supporting "mixed mode" operation and (b) the UE 1112 has received from the network (e.g., from the base station 1102) a new parameter (e.g., a new RRC parameter) indicating to the UE 1112 that it may be scheduled in the mixed mode operation. In one example alternative embodiment, the mixed mode operation may be implicitly enabled when the UE 1112 is configured with two CORESET pools and has received an enhanced TCI States Activation PDSCH MAC CE for single DCI based PDSCH transmission containing at least a mapping of a TCI codepoint k to two TCI states, TCI state $ID_{k,1}$ and TCI state $IDk_{,2}$, for one of the CORESET pools.

Figure 12:
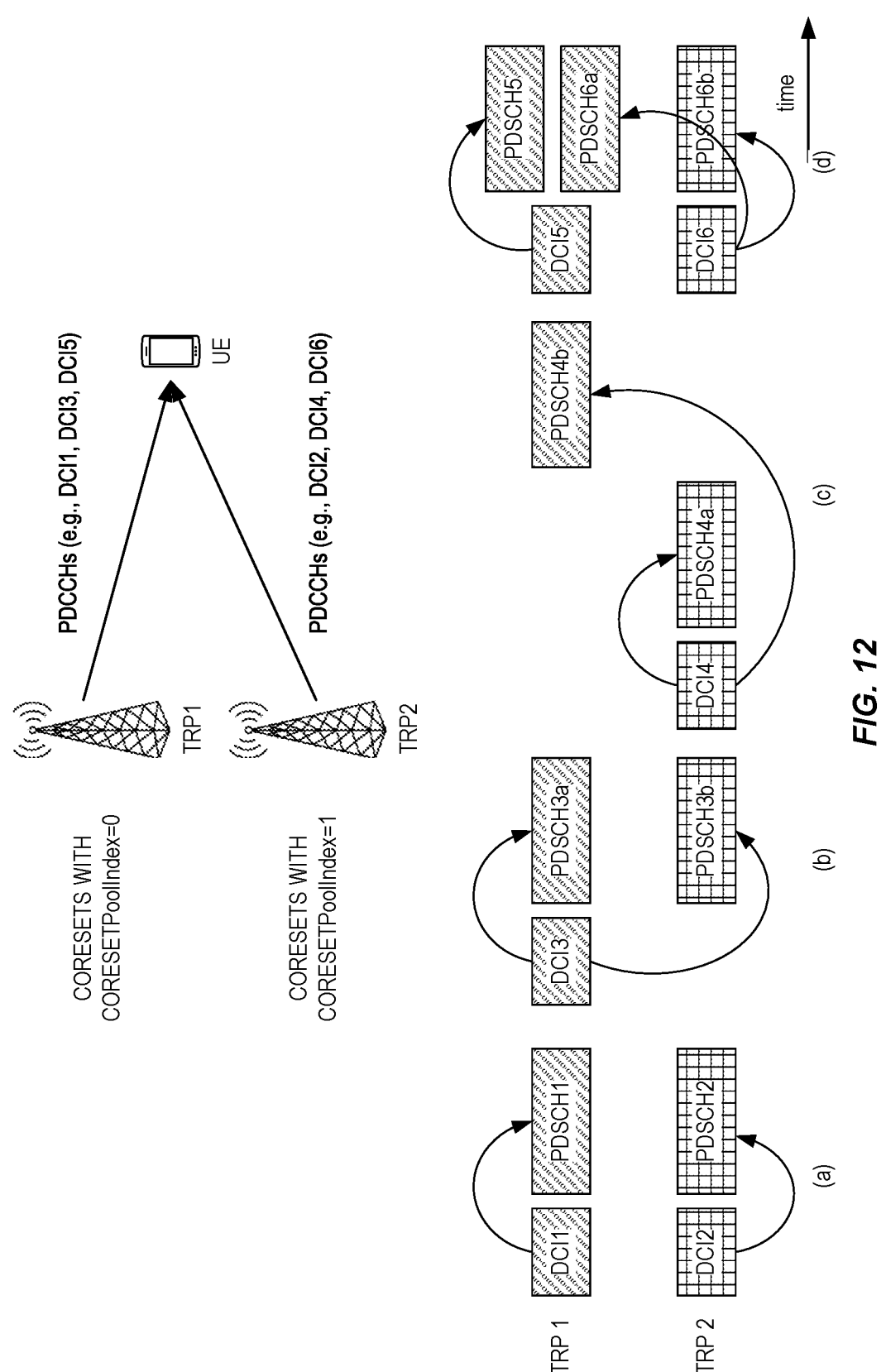
FIG. 12 illustrates an example of mixed mode operation for single-DCI based and multi-DCI based PDSCH scheduling in accordance with one embodiment of the present disclosure.

An example of mixed mode operation in accordance with one embodiment of the present disclosure is shown in FIG. 12.

In FIG. 12(a), DCI1 and DCI2 are used to scheduled PDSCH1 and PDSCH2 from TRP1 and TRP2, respectively. That is, the DCI1 and DCI2 are associated with CORESETs with different pool indices. The two DCIs (and the two PDSCHs) overlap in time in this case and are allowed according to multi-DCI scheduling. This is Rel-16 behavior for multi-DCI scheduling.

In FIG. 12(b) and FIG. 12(c), DCI3 and DCI4 are single DCI scheduling, each scheduling two PDSCHs (or two parts of a single PDSCH) from two TRPs. PDSCH 3a/3b can be Scheme 1a (in which PDSCH 3a/3b represent different layers of a PDSCH), FDMSchemeA (in which PDSCH 3a and PDSCH3b are different part, s of a PDSCH on different frequency resources), or FDM-Scheme-B (in which PDSCH3a and PDSCH3b are two PDSCHs for a same Transport Block (TB) on different frequency resources). PDSCH 4a/4b can be TDMSchemeA (i.e., mini-slot based TDM scheme in which PDSCH 4a and PDSCH4b are for a same TB and transmitted in different mini-slots within a slot), or Scheme 4 (i.e., slot based TDM scheme in which PDSCH 4a and PDSCH4b are for a same TB and transmitted in different slots). This is also a Rel-16 behavior for single DCI scheduling.

In FIG. 12(d), DCI5 and DCI6 correspond to mixed single-DCI and multi-DCI scheduling in a same slot in which DCI5 schedules PDSCH5 from TRP1 while DCI6 schedules PDSCH6a from TRP1 and PDSCH6b from TRP2, where PDSCH5 and PDSCH6a/b overlap in time.

In FIG. 12, PDSCH xa and PDSCH xb ($x \in (3, 4, 6)$) are for a same TB but with a same or different redundancy version, different layers, or different time and/or frequency resources of PDSCH x. This mixed single DCI and multi-DCI based PDSCH scheduling either in different slots or a same slot is new and is not supported in Rel-16. The benefit of such a mixed scheduling enables both scheduling flexibility (e.g., by independent PDSCH scheduling from each TRP) and increased data diversity/reliability by scheduling a PDSCH over two TRPs.

To support the above mixed single and multi-DCI operation, a UE 1112 is configured with one or more CORESETs with CORESETPoolIndex=0 and one or more CORESETs with CORESETPoolIndex=1. In addition, a CORESET pool index may be indicated in a NR Rel-16 TCI activation MAC CE in which one MAC CE per CORESET pool is used for TCI activation. FIG. 13 shows an example where the CORESETPoolIndex is indicated as part of the MAC CE for activating/deactivating TCI states which allows two TCI states to be mapped to a single codepoint in the DCI Transmission Configuration Information field.

In one embodiment, the enabling of single-DCI and multi-DCI PDSCH scheduling operation is given if both of the following conditions are satisfied:

if the UE 1112 is configured with CORESETs belonging to two CORESET pools (i.e., one set of CORESETs with CORESETPoolIndex=0 and a second set of CORESETs with CORESETPoolIndex=1), and if at least one codepoint in DCI Transmission Configuration Information field is mapped to two TCI states via the MAC CE for PDSCH TCI activation (example, a MAC CE in FIG. 13) for at least one of the CORESET pools.

A PDCCH in a search space associated with a CORESET from one CORESET pool may schedule a PDSCH over two TRPs by indicating two TCI states in DCI (that is, at least one DCI Transmission Configuration Indication field codepoint corresponding to the one CORESET pool is mapped to two TCI states). In some cases, a UE 1112 may support the case where PDCCHs associated to any of the CORESET pools may be allowed to schedule PDSCHs over two TRPs by indicating two TCI states in DCI. In a further embodiment, how many CORESET pools are allowed to schedule PDSCHs over two TRPs by indicating two TCI states in DCI is a UE capability which is signaled to the network by the UE 1112 as part of UE capability report.

Figure 10:
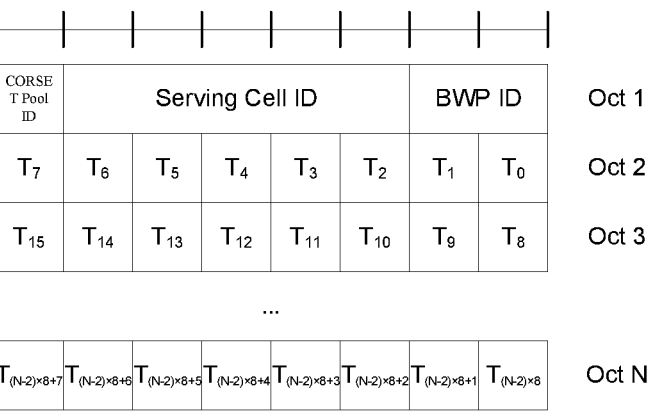
FIG. 10 illustrates an example of a Transmission Configuration Indication (TCI) state activation PDSCH MAC CE in 3GPP NR Release 16.

In another embodiment, the single-DCI/multi-DCI mixed PDSCH scheduling operation can be enabled by modifying the description of the NR Rel-16 TCI activation MAC CE for indicating two TCI states to one DCI Transmission Configuration Indication field codepoint but not adding CORESETPoolIndex to the MAC CE. The description can be modified such that the MAC CE always refers to PDCCH associated with CORESETPoolIndex=0. "Association" here means that the PDCCH is detected in a search space configured to the UE 1112 which is by configuration linked to a CORESET that has configured CORESETPoolIndex and where these configurations are made using RRC from the network (e.g., base station 1102) to the UE 1112. This embodiment can be illustrated by the following example:

A TCI state activation PDSCH MAC CE (referred to as a $1^{st}$ MAC CE in this example) as shown in FIG. 10 is sent to the UE 1112 with CORESETPoolIndex=0. Then, all the DCI Transmission Configuration Indication field codepoints corresponding to CORESETPoolIndex=0 are mapped to only 1 TCI state.

Consider that another TCI state activation PDSCH MAC CE (referred to as a $2^{nd}$ MAC CE in this example) as shown in FIG. 10 is sent to the UE 1112 with CORESETPoolIndex=1. Then, all the DCI Transmission Configuration Indication field codepoints corresponding to CORESETPoolIndex=1 are mapped to only 1 TCI state.

In the next step, consider another MAC CE for TCI state activation for PDSCH similar to the one in FIG. 13 but without the CORESET Pool ID (referred to as a $3^{rd}$ MAC CE in this example). This MAC CE allows more than one TCI state to be mapped to a DCI Transmission Configuration Indication field codepoint. However, when the UE 1112 receives this MAC CE, the UE 1112 applies the DCI Transmission Configuration Indication field codepoint to TCI state mapping provided by this MAC CE to CORESET Pool with CORESETPoolIndex=0. Alternatively stated, the DCI Transmission Configuration Indication field codepoint to TCI state mapping provided by the 1st MAC CE is overwritten by the one provided by the 3rd MAC CE.

In a subsequent sub-embodiment to the two above embodiments, the physical layer specification can further restrict how these PDSCHs should be scheduled. This may be whether these PDSCHs should be scheduled on the exact same time and frequency allocation or in different time locations. That is, with the same RRC/MAC configuration, a UE 1112 could expect to receive simultaneously multi-DCI and single DCI scheduling, or only on time division multiplexed (TDM) manner. There may be UE capability signaling based on which the network knows which mode of "mixed-mode" is supported by the UE 1112. The advantage of the signaling support enabling either of these options is that the network does not need to RRC reconfigure the UE 1112 to switch from single-DCI to multi-DCI even if physical layer specification would restrict the shared time/frequency resource operation.

Embodiments Related to Default TCI States

When the mixed mode using both single-DCI and multi-DCI based PDSCH transmission over multiple TRPs is supported and enabled for the UE 1112, one issue for the UE behavior description is what default TCI(s) should be used when the time offset between the reception of a DCI and the corresponding PDSCH is below the configured threshold parameter value and at least one configured TCI state for the serving cell of scheduled PDSCH contains the 'QCL-TypeD'.

In one embodiment, a first default TCI state and a second default TCI state are introduced where each state is associated with each of the two CORESET pools, respectively. For example, the first default TCI state is the TCI state activated for a CORESET having the lowest ControlResourceSetId among one or more CORESETs configured with the CORESETPoolIndex=0 and monitored by the UE 1112 in the latest slot within the active BWP of the serving cell. Similarly, in this example, the second default TCI state is the TCI state activated for a CORESET having the lowest ControlResourceSetId among one or more CORESETs configured with the CORESETPoolIndex=1 and monitored by the UE 1112 in the latest slot within the active BWP of the serving cell. In this embodiment, whenever the single-DCI and multiple-DCI mixed operation is enabled for the UE 1112, the UE 1112 applies the two default TCI states.

Figure 14:
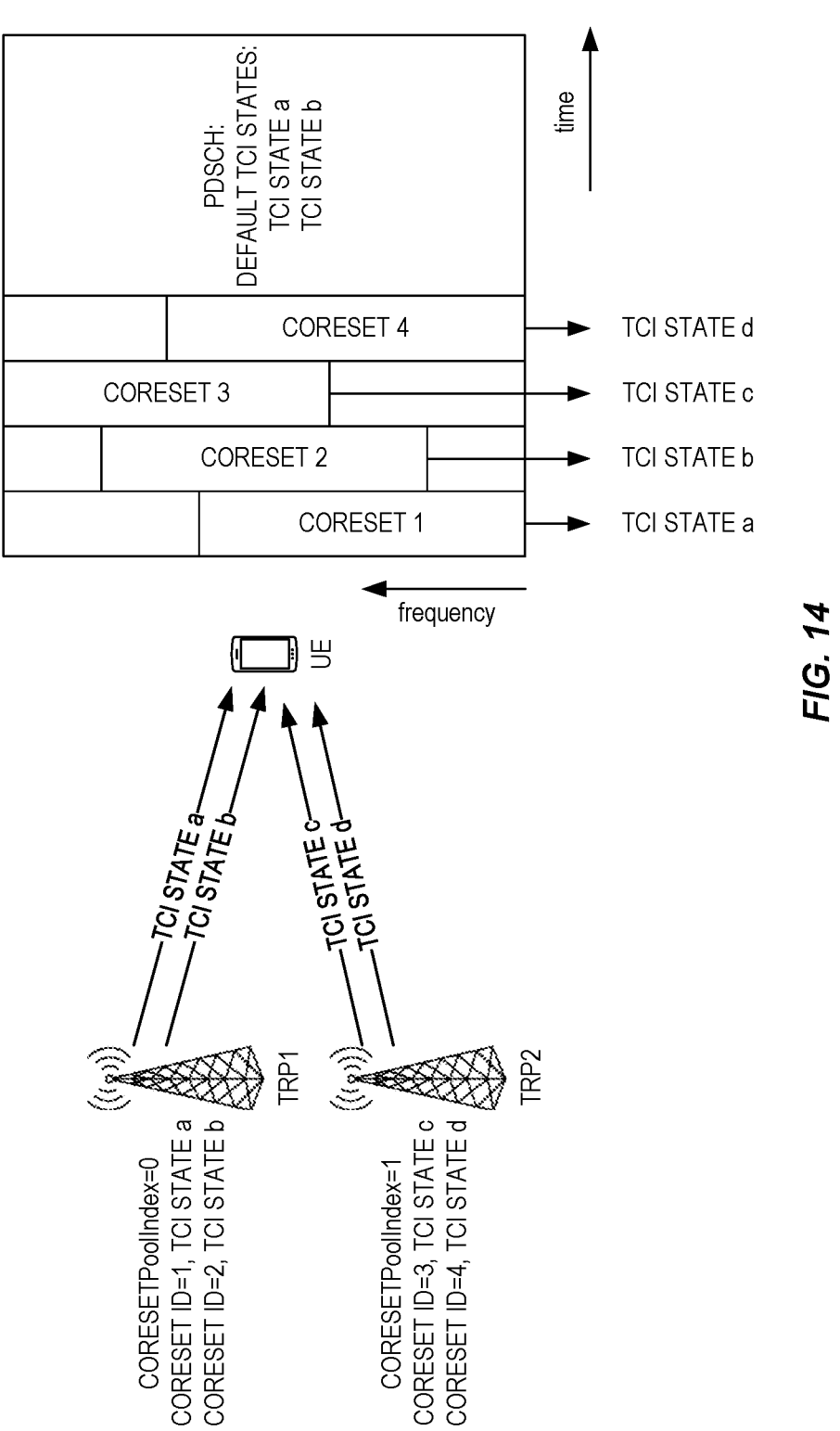
FIG. 14 illustrates an embodiment in which the single-DCI and multiple-DCI mixed operation is enabled for a User Equipment (UE) where the UE applies two default TCI states in accordance with one embodiment of the present disclosure.

An example is shown in FIG. 14, where two CORESETs are associated with CORESETPoolIndex=0 and another two CORESETs are associated with CORESETPoolIndex=1. All four CORESETs are configured in a slot for a UE 1112 to monitor PDCCH. Since CORESET ID=1 and CORESET ID=3 are the lowest CORESET IDs in each CORESET pool, the associated TCI states, TCI states a and c, are the two default TCI states when the single-DCI and multiple-DCI mixed operation is enabled for the UE 1112.

After a DCI is decoded and if one TCI state is indicated, the corresponding PDSCH is sent with the default TCI state associated with a CORESET pool index over which the DCI is received. If two TCI states and DMRS ports in two CDM groups are indicated, the first default TCI state is associated to the DMRS ports in a CDM group containing the first DMRS port (i.e., $p_0$) indicated by the DCI, and the second default TCI state is associated to DMRS port(s) in the other CDM group.

In another embodiment, if at least one TCI codepoint is mapped to two TCI states in at least one of the TCI state activation MAC CEs, the default TCI states are the two TCI states corresponding to the lowest codepoint among the TCI codepoints containing two different TCI states in one of the TCI activation MAC CEs, either with CORESET pool index=0 or 1. In this case, for a PDSCH indicated with one TCI state scheduled with a DCI in a CORESET pool with CORESETPoolIndex=0, the first default TCI state is used decoding for the PDSCH; otherwise if the PDSCH is scheduled with a DCI in a CORESET pool with CORESETPoolIndex=1, the second default TCI state is used decoding for the PDSCH. For a PDSCH indicated with two TCI states and DMRS ports in two CDM groups, the first default TCI state is associated to DMRS port(s) of the CDM group containing the first DMRS port (i.e., $p_0$) indicated in DCI and the second default TCI state is associated to DMRS port(s) in the other CDM group.

In a further embodiment, the two default TCI states when the mixed mode is enabled are explicitly signaled by, for example, a MAC CE.

Embodiments Related to Rate Matching

In multi-DCI based PDSCH transmission, a UE 1112 may be configured with two sets of LTE CRS patterns, each associated with a CORESET pool index. An issue is that when a PDSCH is scheduled over two TRPs, should the PDSCH be rate matched around the union of the two LTE CRS sets or rate matched per TRP?

In one embodiment, when a PDSCH is scheduled with two TCI states, the PDSCH is rate matched around the union of the two sets of the LTE CRS.

In another embodiment, if the PDSCH is for one of FDMSchemeA, FDMSchemeB, TDMSchemeA (mini-slot based TDM Scheme), or TDMSchemeB (slot based TDM scheme), the PDSCH is rate matched around the set of LTE CRS patterns associated to the CORESET pool over which the corresponding DCI is received.

Alternatively, the RRC configured TCI states may be divided into two sets and each set is associated with one CORESET pool. A PDSCH with an indicated TCI state is rate matched around a set of CRS patterns associated with a CORESET pool for which the TCI state is associated to. An example is shown in FIG. 15.

Although dynamically scheduled PDSCH is used in the examples above, the mixed mode operation can also be applied to semi-persistently scheduled PDSCH in which multiple SPS may be configured and activated with either signal DCI or multi-DCI.

Additional Description

FIG. 16A is a flow chart that illustrates the operation of a UE 1112 for reception of data transmission in accordance with at least some embodiments of the present disclosure. Optional steps are represented by dashed boxes. As illustrated, the UE 1112 receives a configuration of a first set of CORESETs and a second set of CORESETs, and a list of TCI states for PDSCH (step 1600). The first set of CORESETs comprises one or more first CORESETs and the second set of CORESETs comprises one or more second CORESETs. Optionally, the UE 1112 receives a configuration of a first search space set associated with one of the one or more first CORESETs and a second search space set associated with one of the one or more second CORESETs (step 1601). The UE 1112 also receives a first TCI activation command associated to the first set of CORESETs and a second TCI activation command associated to the second set of CORESETs (step 1602). Each of the first and second TCI activation commands activates a subset of TCI states from the list of TCI states and maps the activated TCI states to a set of TCI codepoints, wherein at least one TCI codepoint is mapped to two TCI states. The UE 1112 optionally receives a configuration of a first set of LTE CRS patterns and a second set of LTE CRS patterns (step 1603).

The UE 1112 receives a first PDCCH carrying a first DCI in a first CORESET from among the first set of CORESETs and a second PDCCH carrying a second DCI in a second CORESET from among the second set of CORESETs (step 1604). The UE 1112 receives a first one or more PDSCHs scheduled by the first DCI and a second one or more PDSCHs scheduled by the second DCI, wherein at least one of the first and the second DCIs comprises one of the set of TCI codepoints that is mapped to two of the activated TCI states (step 1606).

In one embodiment, the first one or more PDSCHs and the second one or more PDSCHs are fully overlapping, partially overlapping, or non-overlapping in time, but do not overlap in frequency. In another embodiment, the first one or more PDSCHs and the second one or more PDSCHs fully or partially overlap in time and share at least one of the two TCI states.

In one embodiment, when a time offset between reception of the first (or the second) DCI and the first (or the second) one or more PDSCHs is below a pre-configured threshold, a first and a second default TCI states are used for reception of the first (or second) one or more PDSCHs. Similarly, in one embodiment as illustrated in FIG. 16B, receiving the first one or more PDSCHs scheduled by the first DCI and the second one or more PDSCHs scheduled by the second DCI in step 1606 comprises determining that a time offset between reception of the first (or the second) DCI and the first (or the second) one or more PDSCHs is below a pre-configured threshold (step 1606A) and, responsive to determining that the time offset between reception of the first (or the second) DCI and the first (or the second) one or more PDSCHs is below the pre-configured threshold, using (step 1606B) a first and a second default TCI states for reception of the first (or second) one or more PDSCHs. In one embodiment, the first default TCI state is associated to a first CORESET with a lowest CORESET identity among the first set of CORESETs within an active BWP of a serving cell monitored by the UE, and the second default TCI state is associated to a second CORESET with a lowest CORESET identity among the second set of CORESETs within an active BWP of a serving cell monitored by the UE. In one embodiment, the first and the second default TCI states are TCI states corresponding to a lowest codepoint among TCI codepoints containing two different TCI states in the first TCI activation command or the second TCI activation command.

In one embodiment, the UE 1112 divides the list of TCI states into a first set of TCI states and a second set of TCI states, wherein the first set of TCI states is associated to the first set of CORESETs and the second set of TCI states is associated to the second set of CORESETs.

As illustrated, the UE 1112 optionally receives a configuration of a first set of LTE CRS patterns and a second set of LTE CRS patterns in step 1603. In one embodiment, a PDSCH (e.g., one of the one or more first PDSCHs or one of the one or more second PDSCHs) with two TCI states is rate matched around the union of the first and the second sets of LTE CRS patterns. In one embodiment, a PDSCH (e.g., one of the one or more first PDSCHs or one of the one or more second PDSCHs) with one TCI state is rate matched around the first (or the second) set of LTE CRS patterns if the TCI state belongs to the first (or the second) set of TCI states. In one embodiment, a PDSCH is configured with one TCI state and this one TCI state belongs to the first (or the second) set of TCI states, and the PDSCH is rate matched around the first (or the second) set of LTE CRS patterns.

In one embodiment, the UE 1112 sends HARQ A/N for a PDSCH(s)a with two TCI states separately from a PDSCH(s) with a single TCI state.

FIG. 17 is a flow chart that illustrates the operation of one or more network nodes (e.g., one or more TRPs) for data transmission in accordance with at least some embodiments of the present disclosure. Optional steps are represented by dashed boxes. As illustrated, the network node(s) transmits, to a UE 1112, a configuration of a first set of CORESETs and a second set of CORESETs, and a list of TCI states for PDSCH (step 1700). The first set of CORESETs comprises one or more first CORESETs and the second set of CORE-SETs comprise one or more second CORESETs. Optionally, the network node(s) transmits, to the UE 1112, a configuration of a first search space set associated with the first CORESET and a second search space set associated with the second CORESET (step 1701). The network node(s) also transmits, to the UE 1112, a first TCI activation command associated to the first set of CORESETs and a second TCI activation command associated to the second set of CORE-SETs (step 1702). Each of the first and second TCI activation commands activates a subset of TCI states from the list of TCI states and maps the activated TCI states to a set of TCI codepoints, wherein at least one TCI codepoint is mapped to two TCI states. The network node(s) optionally transmits, to the UE 1112, a configuration of a first set of LTE CRS patterns and a second set of LTE CRS patterns (step 1703).

The network node(s) transmit, to the UE 1112, a first PDCCH carrying a first DCI in a first CORESET from among the first set of CORESETs and a second PDCCH carrying a second DCI in a second CORESET from among the second set of CORESETs (step 1704). For example, the first PDCCH may be transmitted by a first TRP, and the second PDCCH may be transmitted by a second TRP. The network node(s) transmit, to the UE 1112, a first one or more PDSCHs scheduled by the first DCI and a second one or more PDSCHs scheduled by the second DCI, wherein at least one of the first and the second DCIs comprises one of the set of TCI codepoints that is mapped to two of the activated TCI states (step 1706).

In one embodiment, the first one or more PDSCHs and the second one or more PDSCHs are fully overlapping, partially overlapping, or non-overlapping in time, but do not overlap in frequency. In another embodiment, the first one or more PDSCHs and the second one or more PDSCHs fully or partially overlap in time and share at least one of the two TCI states.

In one embodiment, when a time offset between transmission of the first (or the second) DCI and the first (or the second) one or more PDSCHs is below a pre-configured threshold, a first and a second default TCI states are used for transmission of the first (or second) one or more PDSCHs. Similarly, in one embodiment, transmitting the first one or more PDSCHs scheduled by the first DCI and the second one or more PDSCHs scheduled by the second DCI in step 1706 comprises transmitting the first one or more PDSCHs scheduled by the first DCI and the second one or more PDSCHs scheduled by the second DCI such that a time offset between transmission of the first (or the second) DCI and the first (or the second) one or more PDSCHs is below a pre-configured threshold, using a first and a second default TCI states for transmission of the first (or second) one or more PDSCHs. In one embodiment, the first default TCI state is associated to a first CORESET with a lowest CORESET identity among the first set of CORESETs within an active BWP of a serving cell monitored by the UE 1112, and the second default TCI state is associated to a second CORESET with a lowest CORESET identity among the second set of CORESETs within an active BWP of a serving cell monitored by the UE 1112. In one embodiment, the first and the second default TCI states are TCI states corresponding to a lowest codepoint among TCI codepoints containing two different TCI states in the first TCI activation command or the second TCI activation command.

In one embodiment, the network node(s) divides the list of TCI states into a first set of TCI states and a second set of TCI states, wherein the first set of TCI states is associated to the first set of CORESETs and the second set of TCI states is associated to the second set of CORESETs.

As illustrated, the network node(s) optionally transmit a configuration of a first set of LTE CRS patterns and a second set of LTE CRS patterns in step 1703. In one embodiment, a PDSCH (e.g., one of the one or more first PDSCHs or one of the one or more second PDSCHs) with two TCI states is rate matched around the union of the first and the second sets of LTE CRS patterns. In one embodiment, a PDSCH (e.g., one of the one or more first PDSCHs or one of the one or more second PDSCHs) with one TCI state is rate matched around the first (or the second) set of LTE CRS patterns if the TCI state belongs to the first (or the second) set of TCI states. In one embodiment, a PDSCH is configured with one TCI state and this one TCI state belongs to the first (or the second) set of TCI states, and the PDSCH is rate matched around the first (or the second) set of LTE CRS patterns.

In one embodiment, the network node(s) receive, from the UE 1112, HARQ A/N for a PDSCH(s)a with two TCI states separately from a PDSCH(s) with a single TCI state.

Figure 18:
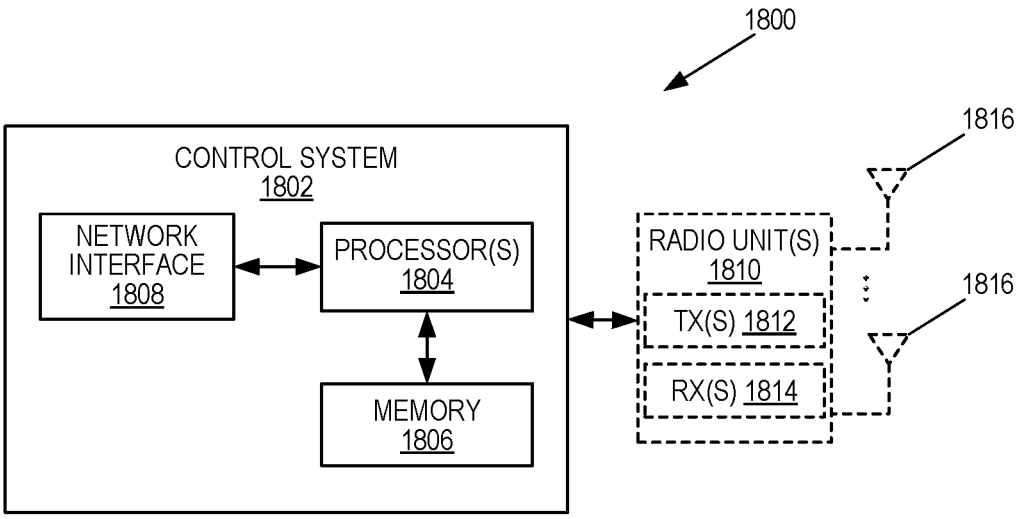
FIGS. 18 through 20 are schematic block diagrams of example embodiments of a network node.

FIG. 18 is a schematic block diagram of a network node 1800 according to some embodiments of the present disclosure. Optional features are represented by dashed boxes. The network node 1800 may be, for example, a base station 1102 or 1106, a TRP, or the like. As illustrated, the network node 1800 includes a control system 1802 that includes one or more processors 1804 (e.g., Central Processing Units (CPUs), Application Specific Integrated Circuits (ASICs), Field Programmable Gate Arrays (FPGAs), and/or the like), memory 1806, and a network interface 1808. The one or more processors 1804 are also referred to herein as processing circuitry. In addition, if the network node 1800 is a radio access node (e.g., a base station 1102, 1106 or a TRP), the network node 1800 may include one or more radio units 1810 that each includes one or more transmitters 1812 and one or more receivers 1814 coupled to one or more antennas 1816. The radio units 1810 may be referred to or be part of radio interface circuitry. In some embodiments, the radio unit(s) 1810 is external to the control system 1802 and connected to the control system 1802 via, e.g., a wired connection (e.g., an optical cable). However, in some other embodiments, the radio unit(s) 1810 and potentially the antenna(s) 1816 are integrated together with the control system 1802. The one or more processors 1804 operate to provide one or more functions of the network node 1800 as described herein (e.g., one or more functions of a network node or TRP as described above, e.g., with respect to FIG. 17). In some embodiments, the function(s) are implemented in software that is stored, e.g., in the memory 1806 and executed by the one or more processors 1804.

Figure 19:
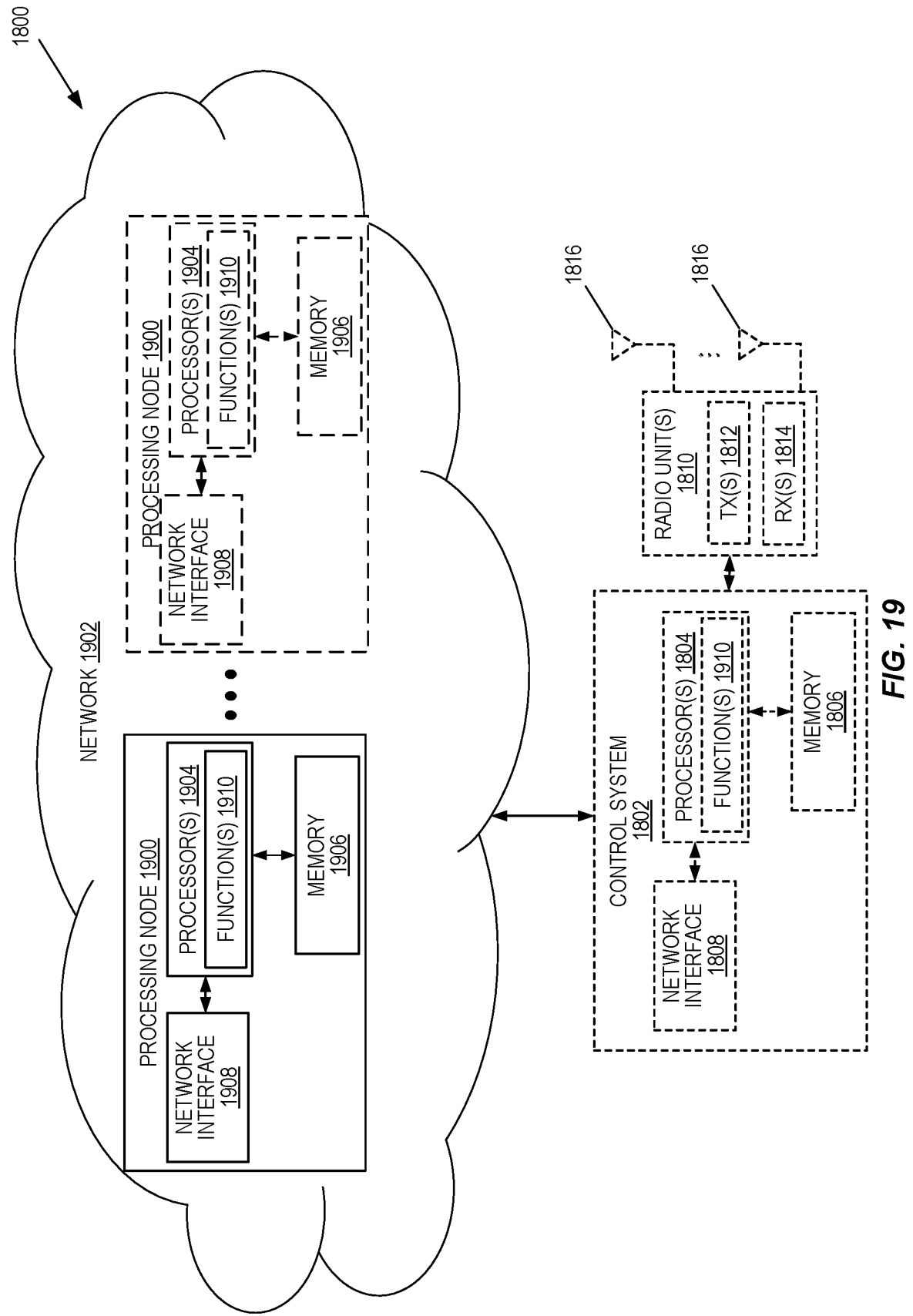

FIG. 19 is a schematic block diagram that illustrates a virtualized embodiment of the network node 1800 according to some embodiments of the present disclosure. A used herein, a "virtualized" network node is an implementation of the network node 1800 in which at least a portion of the functionality of the network node 1800 is implemented as a virtual component(s) (e.g., via a virtual machine(s) executing on a physical processing node(s) in a network(s)). As illustrated, in this example, the network node 1800 may include the control system 1802 and/or the one or more radio units 1810, as described above. The control system 1802 may be connected to the radio unit(s) 1810 via, for example, an optical cable or the like. The network node 1800 includes one or more processing nodes 1900 coupled to or included as part of a network(s) 1902. If present, the control system 1802 or the radio unit(s) are connected to the processing node(s) 1900 via the network 1902. Each processing node 1900 includes one or more processors 1904 (e.g., CPUs, ASICs, FPGAs, and/or the like), memory 1906, and a network interface 1908.

In this example, functions 1910 of the network node 1800 described herein (e.g., one or more functions of a network node or TRP as described above, e.g., with respect to FIG. 17) are implemented at the one or more processing nodes 1900 or distributed across the one or more processing nodes 1900 and the control system 1802 and/or the radio unit(s) 1810 in any desired manner. In some particular embodiments, some or all of the functions 1910 of the network node 1800 described herein are implemented as virtual components executed by one or more virtual machines implemented in a virtual environment(s) hosted by the processing node(s) 1900. As will be appreciated by one of ordinary skill in the art, additional signaling or communication between the processing node(s) 1900 and the control system 1802 is used in order to carry out at least some of the desired functions 1910. Notably, in some embodiments, the control system 1802 may not be included, in which case the radio unit(s) 1810 communicate directly with the processing node(s) 1900 via an appropriate network interface(s).

In some embodiments, a computer program including instructions which, when executed by at least one processor, causes the at least one processor to carry out the functionality of the network node 1800 or a node (e.g., a processing node 1900) implementing one or more of the functions 1910 of the network node 1800 in a virtual environment according to any of the embodiments described herein (e.g., one or more functions of a network node or TRP as described above, e.g., with respect to FIG. 17) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
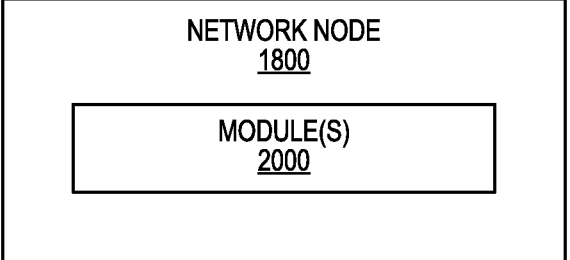

FIG. 20 is a schematic block diagram of the network node 1800 according to some other embodiments of the present disclosure. The network node 1800 includes one or more modules 2000, each of which is implemented in software. The module(s) 2000 provide the functionality of the network node 1800 described herein (e.g., one or more functions of a network node or TRP as described above, e.g., with respect to FIG. 17). This discussion is equally applicable to the processing node 1900 of FIG. 19 where the modules 2000 may be implemented at one of the processing nodes 1900 or distributed across multiple processing nodes 1900 and/or distributed across the processing node(s) 1900 and the control system 1802.

Figure 21:
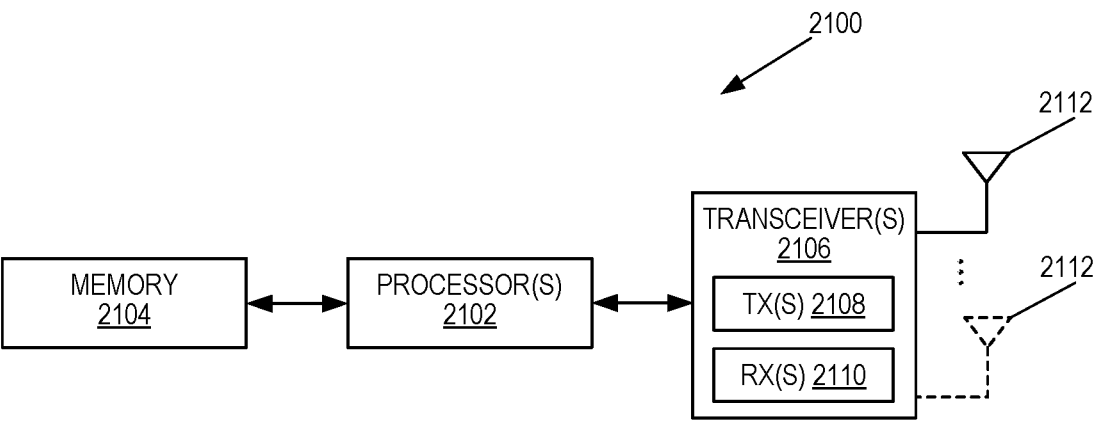
FIGS. 21 and 22 are schematic block diagrams of example embodiments of a UE.

FIG. 21 is a schematic block diagram of a wireless communication device 2100 (e.g., a UE 1112) according to some embodiments of the present disclosure. As illustrated, the wireless communication device 2100 includes one or more processors 2102 (e.g., CPUs, ASICs, FPGAs, and/or the like), memory 2104, and one or more transceivers 2106 each including one or more transmitters 2108 and one or more receivers 2110 coupled to one or more antennas 2112. The transceiver(s) 2106 includes radio-front end circuitry connected to the antenna(s) 2112 that is configured to condition signals communicated between the antenna(s) 2112 and the processor(s) 2102, as will be appreciated by on of ordinary skill in the art. The processors 2102 are also referred to herein as processing circuitry. The transceivers 2106 are also referred to herein as radio circuitry. In some embodiments, the functionality of the wireless communication device 2100 described above (e.g., one or more functions of a UE 1112 as described above, e.g., with respect to FIG. 16A) may be fully or partially implemented in software that is, e.g., stored in the memory 2104 and executed by the processor(s) 2102. Note that the wireless communication device 2100 may include additional components not illustrated in FIG. 21 such as, e.g., one or more user interface components (e.g., an input/output interface including a display, buttons, a touch screen, a microphone, a speaker(s), and/or the like and/or any other components for allowing input of information into the wireless communication device 2100 and/or allowing output of information from the wireless communication device 2100), a power supply (e.g., a battery and associated power circuitry), etc.

In some embodiments, a computer program including instructions which, when executed by at least one processor, causes the at least one processor to carry out the functionality of the wireless communication device 2100 according to any of the embodiments described herein (e.g., one or more functions of a UE 1112 as described above, e.g., with respect to FIG. 16) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
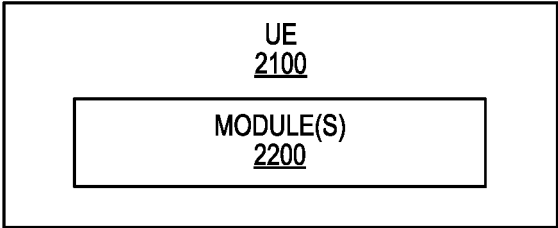

FIG. 22 is a schematic block diagram of the wireless communication device 2100 according to some other embodiments of the present disclosure. The wireless communication device 2100 includes one or more modules 2200, each of which is implemented in software. The module(s) 2200 provide the functionality of the wireless communication device 2100 described herein (e.g., one or more functions of a UE 1112 as described above, e.g., with respect to FIG. 16).

Figure 23:
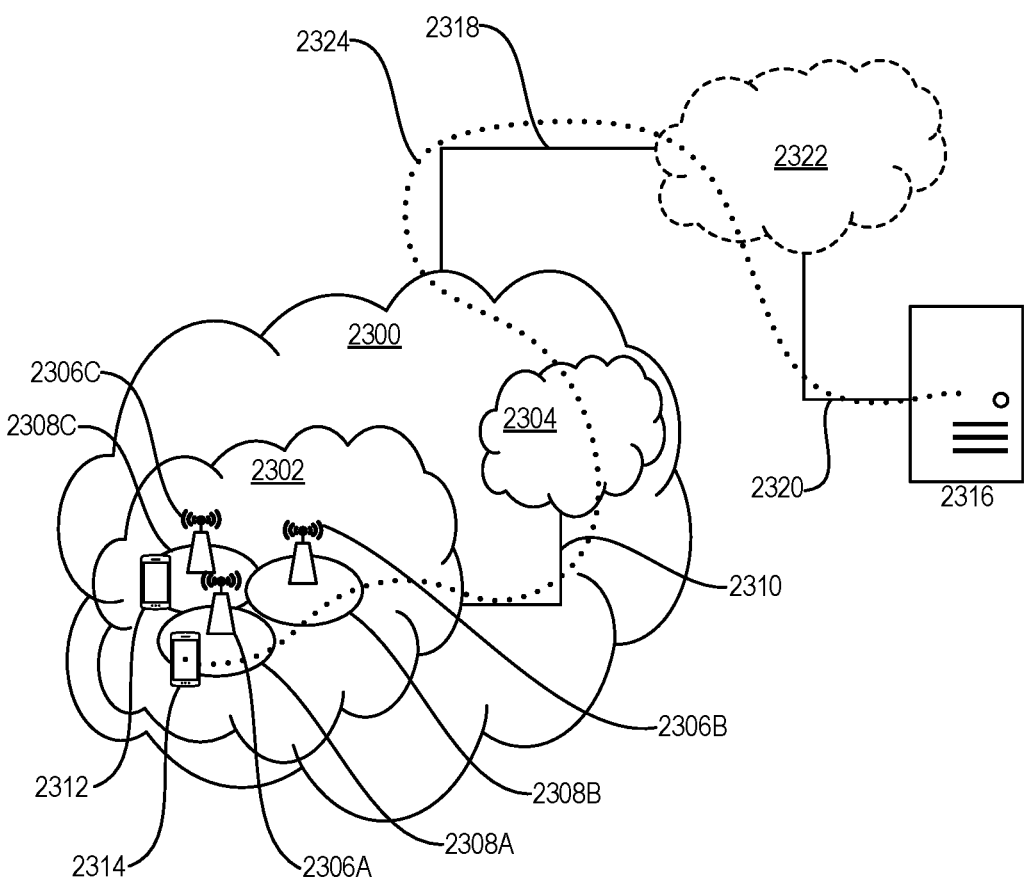
FIG. 23 illustrates an example embodiment of a communication system in which embodiments of the present disclosure may be implemented.

With reference to FIG. 23, in accordance with an embodiment, a communication system includes a telecommunication network 2300, such as a 3GPP-type cellular network, which comprises an access network 2302, such as a RAN, and a core network 2304. The access network 2302 comprises a plurality of base stations 2306A, 2306B, 2306C, such as Node Bs, eNBs, gNBs, or other types of wireless Access Points (APs), each defining a corresponding coverage area 2308A, 2308B, 2308C. Each base station 2306A, 2306B, 2306C is connectable to the core network 2304 over a wired or wireless connection 2310. A first UE 2312 located in coverage area 2308C is configured to wirelessly connect to, or be paged by, the corresponding base station 2306C. A second UE 2314 in coverage area 2308A is wirelessly connectable to the corresponding base station 2306A. While a plurality of UEs 2312, 2314 are illustrated in this example, the disclosed embodiments are equally applicable to a situation where a sole UE is in the coverage area or where a sole UE is connecting to the corresponding base station 2306.

The telecommunication network 2300 is itself connected to a host computer 2316, which may be embodied in the hardware and/or software of a standalone server, a cloud-implemented server, a distributed server, or as processing resources in a server farm. The host computer 2316 may be under the ownership or control of a service provider, or may be operated by the service provider or on behalf of the service provider. Connections 2318 and 2320 between the telecommunication network 2300 and the host computer 2316 may extend directly from the core network 2304 to the host computer 2316 or may go via an optional intermediate network 2322. The intermediate network 2322 may be one of, or a combination of more than one of, a public, private, or hosted network; the intermediate network 2322, if any, may be a backbone network or the Internet; in particular, the intermediate network 2322 may comprise two or more sub-networks (not shown).

The communication system of FIG. 23 as a whole enables connectivity between the connected UEs 2312, 2314 and the host computer 2316. The connectivity may be described as an Over-the-Top (OTT) connection 2324. The host computer 2316 and the connected UEs 2312, 2314 are configured to communicate data and/or signaling via the OTT connection 2324, using the access network 2302, the core network 2304, any intermediate network 2322, and possible further infrastructure (not shown) as intermediaries. The OTT connection 2324 may be transparent in the sense that the participating communication devices through which the OTT connection 2324 passes are unaware of routing of uplink and downlink communications. For example, the base station 2306 may not or need not be informed about the past routing of an incoming downlink communication with data originating from the host computer 2316 to be forwarded (e.g., handed over) to a connected UE 2312. Similarly, the base station 2306 need not be aware of the future routing of an outgoing uplink communication originating from the UE 2312 towards the host computer 2316.

Example implementations, in accordance with an embodiment, of the UE, base station, and host computer discussed in the preceding paragraphs will now be described with reference to FIG. 24. In a communication system 2400, a host computer 2402 comprises hardware 2404 including a communication interface 2406 configured to set up and maintain a wired or wireless connection with an interface of a different communication device of the communication system 2400. The host computer 2402 further comprises processing circuitry 2408, which may have storage and/or processing capabilities. In particular, the processing circuitry 2408 may comprise one or more programmable processors, ASICs, FPGAs, or combinations of these (not shown) adapted to execute instructions. The host computer 2402 further comprises software 2410, which is stored in or accessible by the host computer 2402 and executable by the processing circuitry 2408. The software 2410 includes a host application 2412. The host application 2412 may be operable to provide a service to a remote user, such as a UE 2414 connecting via an OTT connection 2416 terminating at the UE 2414 and the host computer 2402. In providing the service to the remote user, the host application 2412 may provide user data which is transmitted using the OTT connection 2416.

The communication system 2400 further includes a base station 2418 provided in a telecommunication system and comprising hardware 2420 enabling it to communicate with the host computer 2402 and with the UE 2414. The hardware 2420 may include a communication interface 2422 for setting up and maintaining a wired or wireless connection with an interface of a different communication device of the communication system 2400, as well as a radio interface 2424 for setting up and maintaining at least a wireless connection 2426 with the UE 2414 located in a coverage area (not shown in FIG. 24) served by the base station 2418. The communication interface 2422 may be configured to facilitate a connection 2428 to the host computer 2402. The connection 2428 may be direct or it may pass through a core network (not shown in FIG. 24) of the telecommunication system and/or through one or more intermediate networks outside the telecommunication system. In the embodiment shown, the hardware 2420 of the base station 2418 further includes processing circuitry 2430, which may comprise one or more programmable processors, ASICs, FPGAs, or combinations of these (not shown) adapted to execute instructions. The base station 2418 further has software 2432 stored internally or accessible via an external connection.

The communication system 2400 further includes the UE 2414 already referred to. The UE's 2414 hardware 2434 may include a radio interface 2436 configured to set up and maintain a wireless connection 2426 with a base station serving a coverage area in which the UE 2414 is currently located. The hardware 2434 of the UE 2414 further includes processing circuitry 2438, which may comprise one or more programmable processors, ASICs, FPGAs, or combinations of these (not shown) adapted to execute instructions. The UE 2414 further comprises software 2440, which is stored in or accessible by the UE 2414 and executable by the processing circuitry 2438. The software 2440 includes a client application 2442. The client application 2442 may be operable to provide a service to a human or non-human user via the UE 2414, with the support of the host computer 2402. In the host computer 2402, the executing host application 2412 may communicate with the executing client application 2442 via the OTT connection 2416 terminating at the UE 2414 and the host computer 2402. In providing the service to the user, the client application 2442 may receive request data from the host application 2412 and provide user data in response to the request data. The OTT connection 2416 may transfer both the request data and the user data. The client application 2442 may interact with the user to generate the user data that it provides.

Figure 24:
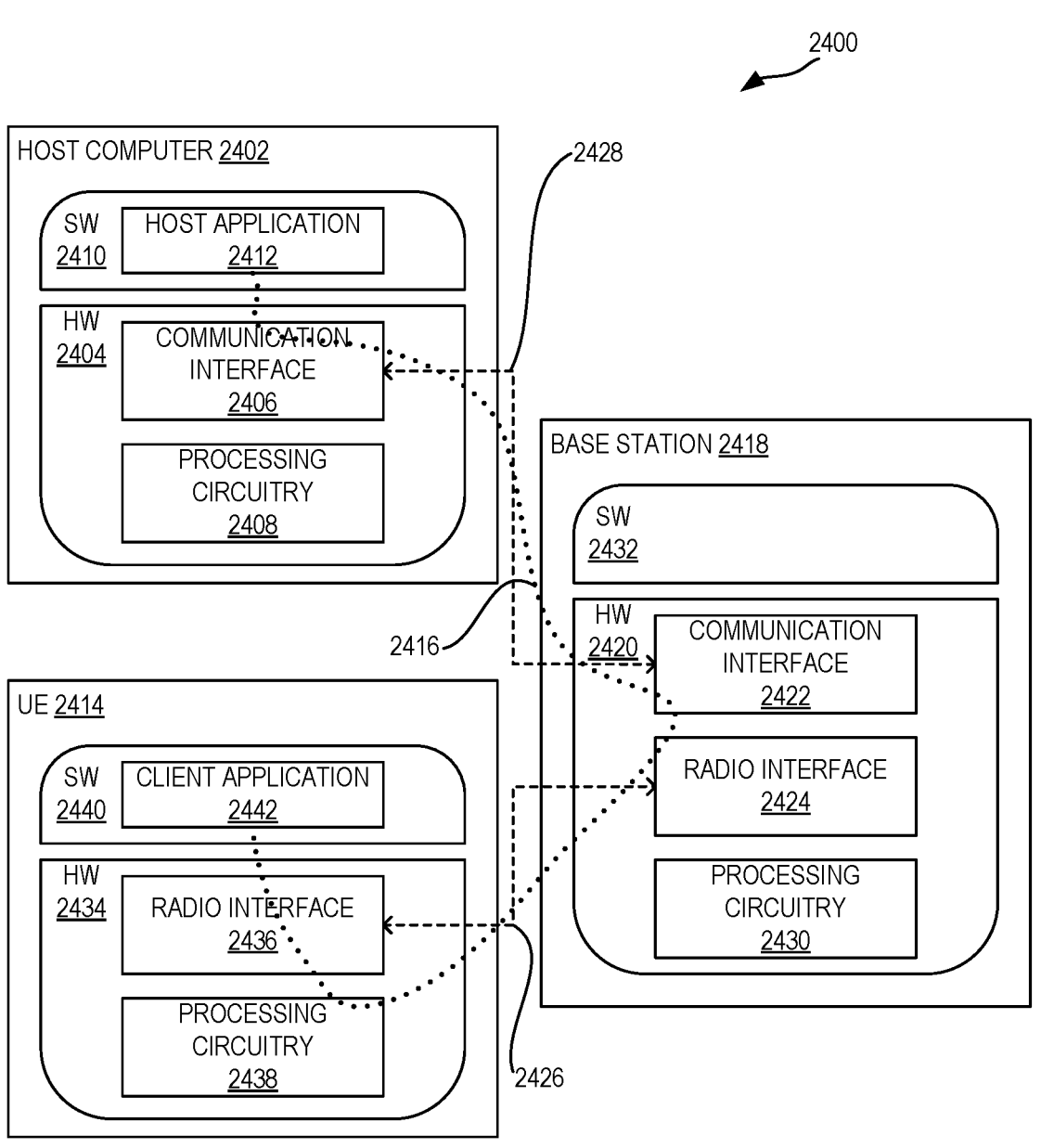
FIG. 24 illustrates example embodiments of the host computer, base station, and UE of FIG. 23.

It is noted that the host computer 2402, the base station 2418, and the UE 2414 illustrated in FIG. 24 may be similar or identical to the host computer 2316, one of the base stations 2306A, 2306B, 2306C, and one of the UEs 2312, 2314 of FIG. 23, respectively. This is to say, the inner workings of these entities may be as shown in FIG. 24 and independently, the surrounding network topology may be that of FIG. 23.

In FIG. 24, the OTT connection 2416 has been drawn abstractly to illustrate the communication between the host computer 2402 and the UE 2414 via the base station 2418 without explicit reference to any intermediary devices and the precise routing of messages via these devices. The network infrastructure may determine the routing, which may be configured to hide from the UE 2414 or from the service provider operating the host computer 2402, or both. While the OTT connection 2416 is active, the network infrastructure may further take decisions by which it dynamically changes the routing (e.g., on the basis of load balancing consideration or reconfiguration of the network).

The wireless connection 2426 between the UE 2414 and the base station 2418 is in accordance with the teachings of the embodiments described throughout this disclosure. One or more of the various embodiments improve the performance of OTT services provided to the UE 2414 using the OTT connection 2416, in which the wireless connection 2426 forms the last segment. More precisely, the teachings of these embodiments may improve, e.g., the data rate, latency, and/or reliability and thereby provide benefits such as, e.g., reduced user waiting time, better responsiveness, or the like.

A measurement procedure may be provided for the purpose of monitoring data rate, latency, and other factors on which the one or more embodiments improve. There may further be an optional network functionality for reconfiguring the OTT connection 2416 between the host computer 2402 and the UE 2414, in response to variations in the measurement results. The measurement procedure and/or the network functionality for reconfiguring the OTT connection 2416 may be implemented in the software 2410 and the hardware 2404 of the host computer 2402 or in the software 2440 and the hardware 2434 of the UE 2414, or both. In some embodiments, sensors (not shown) may be deployed in or in association with communication devices through which the OTT connection 2416 passes; the sensors may participate in the measurement procedure by supplying values of the monitored quantities exemplified above, or supplying values of other physical quantities from which the software 2410, 2440 may compute or estimate the monitored quantities. The reconfiguring of the OTT connection 2416 may include message format, retransmission settings, preferred routing, etc.; the reconfiguring need not affect the base station 2418, and it may be unknown or imperceptible to the base station 2418. Such procedures and functionalities may be known and practiced in the art. In certain embodiments, measurements may involve proprietary UE signaling facilitating the host computer 2402's measurements of throughput, propagation times, latency, and the like. The measurements may be implemented in that the software 2410 and 2440 causes messages to be transmitted, in particular empty or 'dummy' messages, using the OTT connection 2416 while it monitors propagation times, errors, etc.

Figures 25, 26:
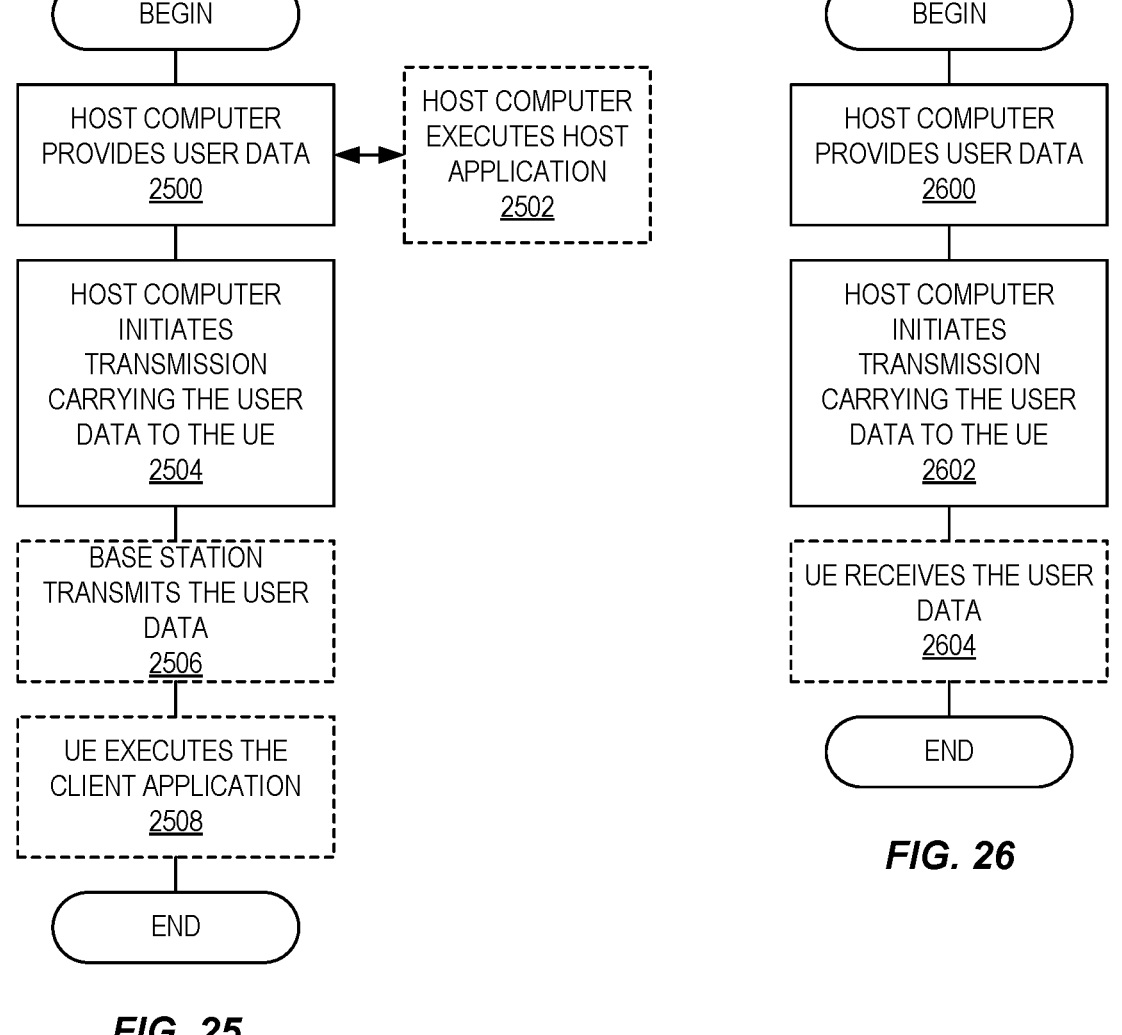
FIGS. 25 and 26 are flow charts that illustrate example embodiments of methods implemented in a communication system such as that of FIG. 23.

FIG. 25 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 25 will be included in this section. In step 2500, the host computer provides user data. In sub-step 2502 (which may be optional) of step 2500, the host computer provides the user data by executing a host application. In step 2504, the host computer initiates a transmission carrying the user data to the UE. In step 2506 (which may be optional), the base station transmits to the UE the user data which was carried in the transmission that the host computer initiated, in accordance with the teachings of the embodiments described throughout this disclosure. In step 2508 (which may also be optional), the UE executes a client application associated with the host application executed by the host computer.

FIG. 26 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 26 will be included in this section. In step 2600 of the method, the host computer provides user data. In an optional sub-step (not shown) the host computer provides the user data by executing a host application. In step 2602, the host computer initiates a transmission carrying the user data to the UE. The transmission may pass via the base station, in accordance with the teachings of the embodiments described throughout this disclosure. In step 2604 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

GROUP A EMBODIMENTS

Embodiment 1: A method of performed by a User Equipment, UE, (1112) for reception of a data transmission in a wireless network (1100), the method comprising one or more of the following:

> receiving (1600) a configuration of a first set of CORESETs and a second set of CORESETs, and a list of TCI states for PDSCH, the first set of CORESETs comprising one or more first CORESETs and the second set of CORESETs comprising one or more second CORESETs; and
>
> receiving (1602) a first TCI activation command associated to the first set of CORESETs and a second TCI activation command associated to the second set of CORESETs, each of the first and second TCI activation commands activating a subset of TCI states from the list of TCI states and mapping the activated TCI states to a set of TCI codepoints, wherein at least one TCI codepoint is mapped to two TCI states; and
>
> receiving (1604) a first PDCCH carrying a first DCI in a first CORESET from among the first set of CORESETs and a second PDCCH carrying a second DCI in a second CORESET from among the second set of CORESETs; and
>
> receiving (1606) a first one or more PDSCHs scheduled by the first DCI and a second one or more PDSCHs scheduled by the second DCI, wherein at least one of the first and the second DCIs comprises one of the set of TCI codepoints that is mapped to two of the activated TCI states.

Embodiment 2: The method of embodiment 1, wherein the first one or more PDSCHs and the second one or more PDSCHs are fully overlapping, partially overlapping, or non-overlapping in time, but do not overlap in frequency.

Embodiment 3: The method of embodiment 1, wherein the first one or more PDSCHs and the second one or more PDSCHs fully or partially overlap in time and share at least one of the two TCI states.

Embodiment 4: The method of any one of embodiments 1 to 3, wherein when a time offset between reception of the first (or the second) DCI and the first (or the second) one or more PDSCHs is below a pre-configured threshold, a first and a second default TCI states are used for reception of the first (or second) one or more PDSCHs.

Embodiment 4A: The method of any one of embodiments 1 to 3, wherein receiving (1606) the first one or more PDSCHs scheduled by the first DCI and the second one or more PDSCHs scheduled by the second DCI comprises: determining that a time offset between reception of the first (or the second) DCI and the first (or the second) one or more PDSCHs is below a pre-configured threshold; and, responsive to determining that the time offset between reception of the first (or the second) DCI and the first (or the second) one or more PDSCHs is below the pre-configured threshold, using a first and a second default TCI states for reception of the first (or second) one or more PDSCHs.

Embodiment 5: The method of embodiment 4 or 4A, wherein the first default TCI state is associated to a first CORESET with a lowest CORESET identity among the first set of CORESETs within an active BWP of a serving cell monitored by the UE, and the second default TCI state is associated to a second CORESET with a lowest CORESET identity among the second set of CORESETs within an active BWP of a serving cell monitored by the UE.

Embodiment 6: The method of embodiment 4 or 4A, wherein the first and the second default TCI states are TCI states corresponding to a lowest codepoint among TCI codepoints containing two different TCI states in the first TCI activation command or the second TCI activation command.

Embodiment 7: The method of any one of embodiments 1 to 6, further comprising dividing the list of TCI states into a first set of TCI states and a second set of TCI states, wherein the first set of TCI states is associated to the first set of CORESETs and the second set of TCI states is associated to the second set of CORESETs.

Embodiment 8: The method of any one of embodiments 1 to 7, further comprising receiving (1603) a configuration of a first set of LTE CRS patterns and a second set of LTE CRS patterns.

Embodiment 9: The method of embodiment 8, wherein a PDSCH (e.g., one of the one or more first PDSCHs or one of the one or more second PDSCHs) with two TCI states is rate matched around the union of the first and the second sets of LTE CRS patterns.

Embodiment 10: The method of embodiment 8, wherein a PDSCH (e.g., one of the one or more first PDSCHs or one of the one or more second PDSCHs) with one TCI state is rate matched around the first (or the second) set of LTE CRS patterns if the TCI state belongs to the first (or the second) set of TCI states.

Embodiment 10A: The method of embodiment 8, wherein a PDSCH is configured with one TCI state and this one TCI state belongs to the first (or the second) set of TCI states, and the PDSCH is rate matched around the first (or the second) set of LTE CRS patterns.

Embodiment 11: The method of any one of embodiments 1 to 10A, further comprising sending (1608) HARQ A/N for PDSCH with two TCI states separately from PDSCH with a single TCI state.

Embodiment 12: The method of any one of embodiments 1 to 11, further comprising receiving (1601) a configuration of a first search space set associated with the first set of CORESETs and a second search space set associated with the second set of CORESETs.

Embodiment 13: The method of any of the previous embodiments, further comprising: providing user data; and forwarding the user data to a host computer via a transmission to the base station.

GROUP B EMBODIMENTS

Embodiment 14: A method performed by one or more network nodes (1102) for data transmission in a wireless network (1100), the method comprising one or more of the following:

> transmitting (1700), to a User Equipment, UE, (1112), a configuration of a first set of CORESETs and a second set of CORESETs, and a list of TCI states for PDSCH, the first set of CORESETs comprising one or more first CORESETs and the second set of CORESETs comprising one or more second CORESETs; and

transmitting (1702), to the UE (1112), a first TCI activation command associated to the first set of CORESETs and a second TCI activation command associated to the second set of CORESETs, each of the first and second TCI activation commands activating a subset of TCI states from the list of TCI states and mapping the activated TCI states to a set of TCI codepoints, wherein at least one TCI codepoint is mapped to two TCI states; and transmitting (1704), to the UE (1112), a first PDCCH carrying a first DCI in a first CORESET from among the first set of CORESETs and a second PDCCH carrying a second DCI in a second CORESET from among the second set of CORESETs; and transmitting (1606), the UE (1112), a first one or more PDSCHs scheduled by the first DCI and a second one or more PDSCHs scheduled by the second DCI, wherein at least one of the first and the second DCIs comprises one of the set of TCI codepoints that is mapped to two of the activated TCI states.

Embodiment 15: The method of embodiment 14, wherein the first one or more PDSCHs and the second one or more PDSCHs are fully overlapping, partially overlapping, or non-overlapping in time, but do not overlap in frequency.

Embodiment 16: The method of embodiment 14, wherein the first one or more PDSCHs and the second one or more PDSCHs fully or partially overlap in time and share at least one of the two TCI states.

Embodiment 17: The method of any one of embodiments 14 to 16, wherein when a time offset between transmission of the first (or the second) DCI and the first (or the second) one or more PDSCHs is below a pre-configured threshold, a first and a second default TCI states are used for transmission of the first (or second) one or more PDSCHs.

Embodiment 17A: The method of any one of embodiments 14 to 16, wherein transmitting (1706) the first one or more PDSCHs scheduled by the first DCI and the second one or more PDSCHs scheduled by the second DCI comprises: transmitting (1706) the first one or more PDSCHs scheduled by the first DCI and the second one or more PDSCHs scheduled by the second DCI such that a time offset between transmission of the first (or the second) DCI and the first (or the second) one or more PDSCHs is below a pre-configured threshold, using a first and a second default TCI states for transmission of the first (or second) one or more PDSCHs.

Embodiment 18: The method of embodiment 17 or 17A, wherein the first default TCI state is associated to a first CORESET with a lowest CORESET identity among the first set of CORESETs within an active BWP of a serving cell monitored by the UE, and the second default TCI state is associated to a second CORESET with a lowest CORESET identity among the second set of CORESETs within an active BWP of a serving cell monitored by the UE.

Embodiment 19: The method of embodiment 17 or 17A, wherein the first and the second default TCI states are TCI states corresponding to a lowest codepoint among TCI codepoints containing two different TCI states in the first TCI activation command or the second TCI activation command.

Embodiment 20: The method of any one of embodiments 14 to 19, further comprising dividing the list of TCI states into a first set of TCI states and a second set of TCI states, wherein the first set of TCI states is associated to the first set of CORESETs and the second set of TCI states is associated to the second set of CORESETs.

Embodiment 21: The method of any one of embodiments 14 to 20, further comprising transmitting (1703) a configuration of a first set of LTE CRS patterns and a second set of LTE CRS patterns.

Embodiment 22: The method of embodiment 21, wherein a PDSCH (e.g., one of the one or more first PDSCHs or one of the one or more second PDSCHs) with two TCI states is rate matched around the union of the first and the second sets of LTE CRS patterns.

Embodiment 23: The method of embodiment 21, wherein a PDSCH (e.g., one of the one or more first PDSCHs or one of the one or more second PDSCHs) with one TCI state is rate matched around the first (or the second) set of LTE CRS patterns if the TCI state belongs to the first (or the second) set of TCI states.

Embodiment 23A: The method of embodiment 21, wherein a PDSCH is configured with one TCI state and this one TCI state belongs to the first (or the second) set of TCI states, and the PDSCH is rate matched around the first (or the second) set of LTE CRS patterns.

Embodiment 24: The method of any one of embodiments 14 to 23A, further comprising receiving (1708) HARQ A/N for PDSCH with two TCI states separately from PDSCH with a single TCI state.

Embodiment 25: The method of any one of embodiments 14 to 24, further comprising transmitting (1701) a configuration of a first search space set associated with the first set of CORESETs and a second search space set associated with the second set of CORESETs.

Embodiment 26: The method of any of the previous embodiments, further comprising: obtaining user data; and forwarding the user data to a host computer or a wireless device.

GROUP C EMBODIMENTS

Embodiment 27: A wireless device comprising: processing circuitry configured to perform any of the steps of any of the Group A embodiments; and power supply circuitry configured to supply power to the wireless device.

Embodiment 28: A network node comprising: processing circuitry configured to perform any of the steps of any of the Group B embodiments; and power supply circuitry configured to supply power to the base station.

Embodiment 29: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 30: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 31: The communication system of the previous embodiment further including the base station.

Embodiment 32: The communication system of the previous 2 embodiments, further including the UE, wherein the UE is configured to communicate with the base station.

Embodiment 33: The communication system of the previous 3 embodiments, wherein: the processing circuitry of the host computer is configured to execute a host application, thereby providing the user data; and the UE comprises processing circuitry configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 35: The method of the previous embodiment, further comprising, at the base station, transmitting the user data.

Embodiment 36: The method of the previous 2 embodiments, wherein the user data is provided at the host computer by executing a host application, the method further comprising, at the UE, executing a client application associated with the host application.

Embodiment 37: A User Equipment, UE, configured to communicate with a base station, the UE comprising a radio interface and processing circuitry configured to perform the method of the previous 3 embodiments.

Embodiment 38: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 39: The communication system of the previous embodiment, wherein the cellular network further includes a base station configured to communicate with the UE.

Embodiment 40: The communication system of the previous 2 embodiments, wherein: the processing circuitry of the host computer is configured to execute a host application, thereby providing the user data; and the UE's processing circuitry is configured to execute a client application associated with the host application.

Embodiment 41: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 42: The method of the previous embodiment, further comprising at the UE, receiving the user data from the base station.

Those skilled in the art will recognize improvements and modifications to the embodiments of the present disclosure. All such improvements and modifications are considered within the scope of the concepts disclosed herein.

The invention claimed is:

1. A method of performed by a User Equipment, UE, for reception of a data transmission in a wireless network, the method comprising:

receiving, from a network node, a configuration of a first set of Control Resource Sets, CORESETs, and a second set of CORESETs, and a list of Transmission Configuration Indication, TCI, states for Physical Downlink Shared Channel, PDSCH, wherein the first set of CORESETs comprises one or more first CORESETs and the second set of CORESETs comprises one or more second CORESETs;

receiving, from a network node, a first TCI activation command associated to the first set of CORESETs and a second TCI activation command associated to the second set of CORESETs, wherein:

the first TCI activation command activates a first subset of TCI states from the list of TCI states to provide first activated TCI states and maps the first activated TCI states to a set of TCI codepoints; and the second TCI activation command activates a second subset of the TCI states from the list of TCI states to provide second activated TCI states and maps the second activated TCI states to the set of TCI codepoints;

receiving a first Physical Downlink Control Channel, PDCCH, carrying a first Downlink Control Information, DCI, in a first CORESET from among the first set of CORESETs and a second PDCCH carrying a second DCI in a second CORESET from among the second set of CORESETs; and receiving a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b), wherein the first one or more PDSCHs and the second one or more PDSCHs fully or partially overlap in time; and wherein a subset of the first activated TCI states that is mapped to the one of the set of TCI codepoints comprised in the first DCI and a subset of the second activated TCI states that is mapped to the one of the set of TCI codepoints comprised in the second DCI share at least one TCI state in common.

2. The method of claim 1, wherein the first one or more PDSCHs and the second one or more PDSCHs do not overlap in frequency.

3. The method of claim 1, wherein, when a time offset between reception of the first DCI and the first one or more PDSCHs is below a pre-configured threshold, a first and second default TCI states are used for reception of the first one or more PDSCHs.

4. The method of claim 1, wherein when a time offset between reception of the second DCI and the second one or more PDSCHs is below a pre-configured threshold, a first and second default TCI states are used for reception of the second one or more PDSCHs.

5. The method of claim 1, wherein receiving the first one or more PDSCHs scheduled by the first DCI and the second one or more PDSCHs scheduled by the second DCI comprises:

determining that a time offset between reception of the first DCI and the first one or more PDSCHs is below a pre-configured threshold; and responsive to determining that the time offset between reception of the first DCI and the first one or more PDSCHs is below the pre-configured threshold, using a first and second default TCI states for reception of the first one or more PDSCHs.

6. The method of claim 1, wherein receiving the first one or more PDSCHs scheduled by the first DCI and the second one or more PDSCHs scheduled by the second DCI comprises:

determining that a time offset between reception of the second DCI and the second one or more PDSCHs is below a pre-configured threshold; and responsive to determining that the time offset between reception of the second DCI and the second one or more PDSCHs is below the pre-configured threshold, using a first and second default TCI states for reception of the second one or more PDSCHs.

7. The method of any of claim 3, wherein the first default TCI state is associated to a first CORESET with a lowest CORESET identity among the first set of CORESETs within an active bandwidth part of a serving cell monitored by the UE, and the second default TCI state is associated to a second CORESET with a lowest CORESET identity among the second set of CORESETs within an active bandwidth part of a serving cell monitored by the UE.

8. The method of claim 3, wherein the first and second default TCI states are TCI states corresponding to a lowest codepoint among TCI codepoints containing two different TCI states in the first TCI activation command or the second TCI activation command.

9. The method of claim 1, further comprising dividing the list of TCI states into a first set of TCI states and a second set of TCI states, wherein the first set of TCI states is associated to the first set of CORESETs and the second set of TCI states is associated to the second set of CORESETs.

10. The method of claim 1, further comprising receiving a configuration of a first set of Long Term Evolution, LTE, Cell-specific Resource Signal, CRS, patterns and a second set of LTE CRS patterns.

11. The method of claim 10, wherein a PDSCH with two TCI states is rate matched around the union of the first and the second sets of LTE CRS patterns, the PDSCH being one of the first one or more PDSCHs or one of the second one or more PDSCHs.

12. The method of claim 10, wherein a PDSCH with one TCI state is rate matched around the first or the second set of LTE CRS patterns if the TCI state belongs to the first or the second set of TCI states, the PDSCH being one of the first one or more PDSCHs or one of the second one or more PDSCHs.

13. The method of claim 10, wherein a PDSCH is configured with one TCI state and this one TCI state belongs to the first or the second set of TCI states, and the PDSCH is rate matched around the first or the second set of LTE CRS patterns.

14. The method of claim 1, further comprising sending Hybrid Automatic Repeat Request, HARQ, Acknowledgement/Negative Acknowledgement, A/N, feedback for PDSCH with two TCI states separately from PDSCH with a single TCI state.

15. The method of claim 1, further comprising receiving a configuration of a first search space set associated with one of the CORESETs in the first set of CORESETs and a second search space set associated with one of the CORESETs in the second set of CORESETs.

16. The method of claim 15 wherein the first DCI is received in the first search space set, and the second DCI is received in the second search space set.

17. A User Equipment, UE, for reception of a data transmission in a wireless network, the UE comprising:
one or more transmitters;
one or more receivers; and
processing circuitry associated with the one or more transmitters and the one or more receivers, the processing circuitry configured to cause the UE to:
receive, from a network node, a configuration of a first set of Control Resource Sets, CORESETs, and a second set of CORESETs, and a list of Transmission Configuration Indication, TCI, states for Physical Downlink Shared Channel, PDSCH, wherein the first set of CORESETs comprises one or more first CORESETs and the second set of CORESETs comprises one or more second CORESETs;
receive, from a network node, a first TCI activation command associated to the first set of CORESETs and a second TCI activation command associated to the second set of CORESETs, wherein:
the first TCI activation command activates a first subset of TCI states from the list of TCI states to provide first activated TCI states and maps the first activated TCI states to a set of TCI codepoints; and
the second TCI activation command activates a second subset of the TCI states from the list of TCI states to provide second activated TCI states and maps the second activated TCI states to the set of TCI codepoints;
receive a first Physical Downlink Control Channel, PDCCH, carrying a first Downlink Control Information, DCI, in a first CORESET from among the first set of CORESETs and a second PDCCH carrying a second DCI in a second CORESET from among the second set of CORESETs; and
receive a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b),
wherein the first one or more PDSCHs and the second one or more PDSCHs fully or partially overlap in time; and
wherein a subset of the first activated TCI states that is mapped to the one of the set of TCI codepoints comprised in the first DCI and a subset of the second activated TCI states that is mapped to the one of the set of TCI codepoints comprised in the second DCI share at least one TCI state in common.

18. A method performed by one or more network nodes for data transmission in a wireless network, the method comprising:
transmitting, to a User Equipment, UE, a configuration of a first set of Control Resource Sets, CORESETs, and a second set of CORESETs, and a list of Transmission Configuration Indication, TCI, states for Physical Downlink Shared Channel, PDSCH, wherein the first set of CORESETs comprises one or more first CORE- SETs and the second set of CORESETs comprises one or more second CORESETs; and transmitting, to the UE, a first TCI activation command associated to the first set of CORESETs and a second TCI activation command associated to the second set of CORESETs, wherein:

the first TCI activation command activates a first subset of TCI states from the list of TCI states to provide first activated TCI states and maps the first activated TCI states to a set of TCI codepoints; and the second TCI activation command activates a second subset of the TCI states from the list of TCI states to provide second activated TCI states and maps the second activated TCI states to the set of TCI codepoints; and transmitting, to the UE, a first Physical Downlink Control Channel, PDCCH, carrying a first Downlink Control Information, DCI, in a first CORESET from among the first set of CORESETs and a second PDCCH carrying a second DCI in a second CORESET from among the second set of CORESETs; and transmitting, the UE, a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b), wherein the first one or more PDSCHs and the second one or more PDSCHs fully or partially overlap in time; and wherein a subset of the first activated TCI states that is mapped to the one of the set of TCI codepoints comprised in the first DCI and a subset of the second activated TCI states that is mapped to the one of the set of TCI codepoints comprised in the second DCI share at least one TCI state in common.

19. A system comprising one or more network nodes for data transmission in a wireless network, the system adapted to:

transmit, to a User Equipment, UE, a configuration of a first set of Control Resource Sets, CORESETs, and a second set of CORESETs, and a list of Transmission Configuration Indication, TCI, states for Physical Downlink Shared Channel, PDSCH, wherein the first set of CORESETs comprises one or more first CORESETs and the second set of CORESETs comprises one or more second CORESETs; and transmit, to the UE, a first TCI activation command associated to the first set of CORESETs and a second TCI activation command associated to the second set of CORESETs, wherein:

the first TCI activation command activates a first subset of TCI states from the list of TCI states to provide first activated TCI states and maps the first activated TCI states to a set of TCI codepoints; and the second TCI activation command activates a second subset of the TCI states from the list of TCI states to provide second activated TCI states and maps the second activated TCI states to the set of TCI codepoints; and transmit, to the UE, a first Physical Downlink Control Channel, PDCCH, carrying a first Downlink Control Information, DCI, in a first CORESET from among the first set of CORESETs and a second PDCCH carrying a second DCI in a second CORESET from among the second set of CORESETs; and transmit, the UE, a first one or more PDSCHs scheduled by the first DCI and a second one or more PDSCHs scheduled by the second DCI, wherein (a) the first DCI comprises one of the set of TCI codepoints that is mapped by the first TCI activation command to two of the first activated TCI states, (b) the second DCI comprises one of the set of TCI codepoints that is mapped by the second TCI activation command to two of the second activated TCI states, or both (a) and (b), wherein the first one or more PDSCHs and the second one or more PDSCHs fully or partially overlap in time; and wherein a subset of the first activated TCI states that is mapped to the one of the set of TCI codepoints comprised in the first DCI and a subset of the second activated TCI states that is mapped to the one of the set of TCI codepoints comprised in the second DCI share at least one TCI state in common.

\* \* \* \* \*